(12) United States Patent
Robinson

(10) Patent No.: US 8,517,309 B2
(45) Date of Patent: Aug. 27, 2013

(54) INTEGRALLY STIFFENED PANEL

(75) Inventor: Robert L. Robinson, Mansfield, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/486,499

(22) Filed: Jun. 1, 2012

(65) Prior Publication Data

US 2012/0305708 A1 Dec. 6, 2012

Related U.S. Application Data

(60) Provisional application No. 61/492,544, filed on Jun. 2, 2011.

(51) Int. Cl.
*B64C 1/06* (2006.01)
*E04C 2/38* (2006.01)
*B32B 3/20* (2006.01)

(52) U.S. Cl.
USPC ............. 244/119; 244/131; 52/630; 428/178; 428/180

(58) Field of Classification Search
USPC ............. 244/117 R, 119, 120, 123.1, 213.12, 244/123.3, 129.5; 52/630, 790.1, 793.1; 428/178, 180, 183
See application file for complete search history.

(56) References Cited

U.S. PATENT DOCUMENTS

| | | | | |
|---|---|---|---|---|
| 1,356,000 A | * | 10/1920 | Nelson | 52/630 |
| 1,427,120 A | * | 8/1922 | Nelson | 52/630 |
| 2,869,228 A | | 1/1959 | Martin | |
| 3,133,616 A | * | 5/1964 | Haskins | 52/300 |
| 3,299,598 A | * | 1/1967 | Alleaume | 428/604 |
| 3,940,891 A | * | 3/1976 | Slysh | 52/82 |
| 4,012,549 A | * | 3/1977 | Slysh | 428/116 |
| 4,725,334 A | | 2/1988 | Brimm | |
| 4,828,202 A | * | 5/1989 | Jacobs et al. | 244/117 R |
| 6,877,286 B2 | * | 4/2005 | Johnson | 52/202 |
| 8,079,549 B2 | * | 12/2011 | Gouvea | 244/119 |
| 2002/0030136 A1 | * | 3/2002 | Chiu | 244/17.15 |
| 2004/0055349 A1 | | 3/2004 | El-Soudani | |
| 2007/0227094 A1 | * | 10/2007 | Oscar | 52/630 |
| 2009/0320398 A1 | * | 12/2009 | Gouvea | 52/309.1 |

FOREIGN PATENT DOCUMENTS

FR 845332 8/1939
GB 520249 4/1940

OTHER PUBLICATIONS

Extended European Search Report for related European Patent Application No. 12169744.5, dated Oct. 24, 2012, 6 pages.

* cited by examiner

*Primary Examiner* — Joseph W Sanderson
(74) *Attorney, Agent, or Firm* — Noah A. Tevis

(57) ABSTRACT

The integrally stiffened panel includes one or more stiffeners oriented in one direction, and one or more stiffeners oriented in a different direction. The stiffeners are integral with a sheet member and intersect at a joint. The joint is configured to incorporate a pocket at the stiffener intersections. The pocket geometry is inverse to the stiffener geometry, and thereby provides moment and stiffness continuity across the joint and between adjacent intersecting stiffeners.

19 Claims, 26 Drawing Sheets

INTEGRALLY STIFFENED PANEL

CROSS REFERENCE TO RELATED APPLICATIONS

This application is a Non-provisional Application of U.S. Application No. 61/492,544, filed 2 Jun. 2011, titled "Integrally Stiffened Panel," which is hereby incorporated by reference for all purposes as if fully set forth herein.

BACKGROUND

1. Technical Field

The apparatuses of the present application relate to integrally stiffened panels. Each integrally stiffened panel includes stiffeners that intersect at a joint, the joint having pocket geometry that is inverse to the basic stiffener geometry. As such, the geometry of the inverse pocket is configured to provide stiffness and moment continuity across the stiffener intersection.

2. Description of Related Art

Both structural and non-structural panels commonly employ beads to increase the strength and stiffness of a panel. Referring to FIG. 1, one type of a conventional stiffened panel 101 is illustrated. Panel 101 includes a sheet web 105, a frame, member 107, and a plurality of beads 103a-103d. In the exemplary embodiment, beads 103a-103d are configured to improve the shear buckling capability of the sheet web 105.

One shortcoming of panel 101 is that beads 103a-103c terminate prior to an intersection with bead 103d. As such, panel 101 is susceptible to buckling deformation in the area between beads 103a-103c and bead 103d. Further, panel 101 is susceptible to buckling in the areas between beads 103a-103d and frame member 107. As a result, panel 101 may require an edge doubler or other structural reinforcement, thereby adding weight to the panel 101.

Hence, there is a need for an improved stiffened panel.

DESCRIPTION OF THE DRAWINGS

The novel features believed characteristic of the apparatuses of the present application are set forth in the appended claims. However, each apparatus itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
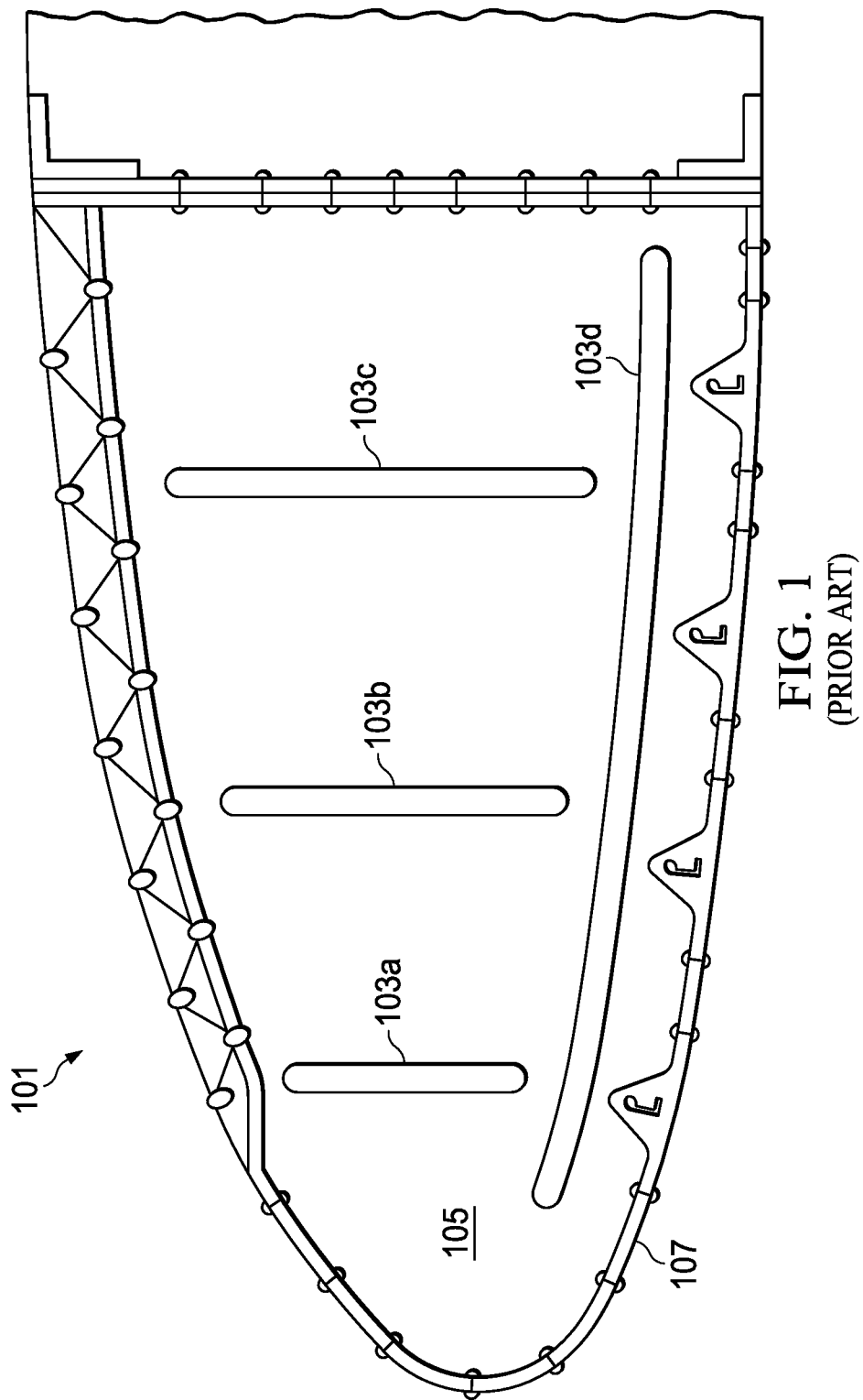
FIG. 1 is a side view of a conventional panel.
Figure 2:
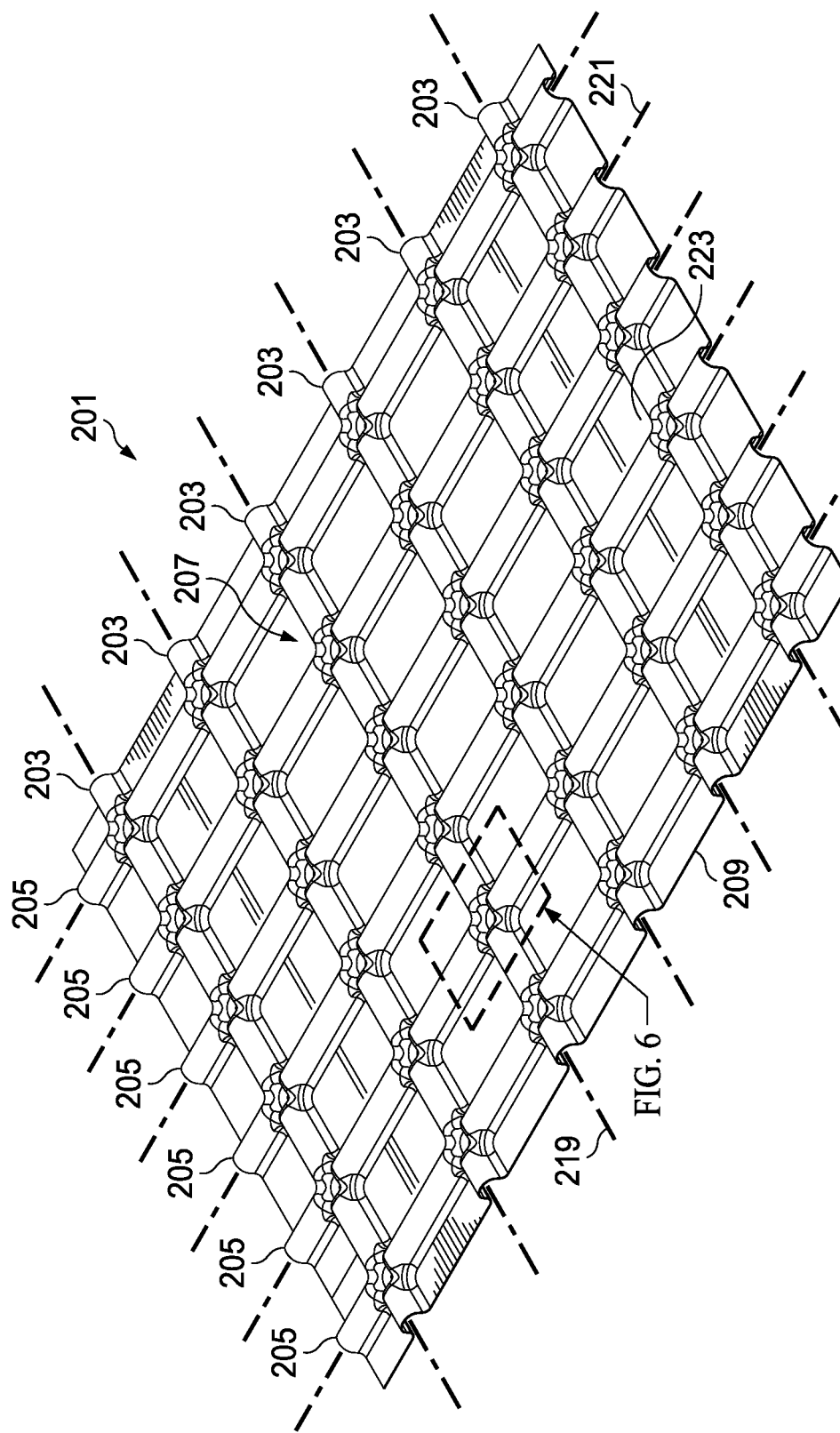
FIG. 2 is a perspective view of an integrally stiffened panel, according to the preferred embodiment of the present application.
Figure 3:
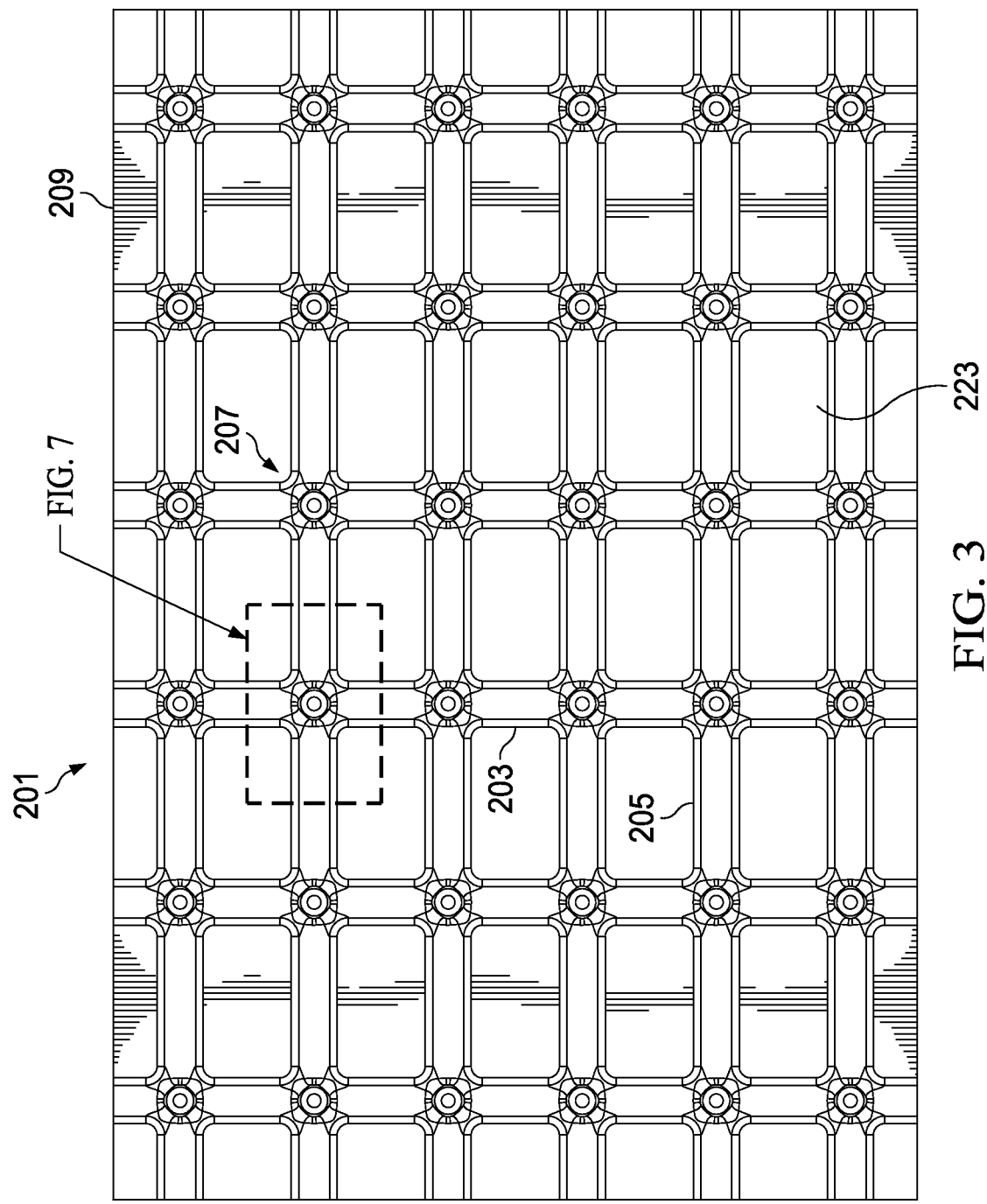
FIG. 3 is a top view of the integrally stiffened panel from FIG. 2, according to the preferred embodiment of the present application.
Figure 4:
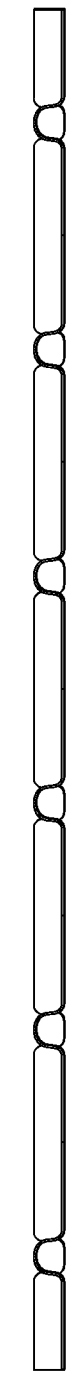
FIG. 4 is a front view of the integrally stiffened panel from FIG. 2, according to the preferred embodiment of the present application.

Illustrative embodiments of the apparatuses of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present application includes embodiments of integrally stiffened panels, each panel having a plurality of bead stiffeners. The bead stiffeners intersect at joints, at least one joint having inverted pocket geometry to provide moment and stiffness continuity across the intersecting bead stiffeners.

Referring to FIGS. 2-6, an exemplary panel 201 is illustrated. Panel 201 includes a plurality of bead stiffeners 203 oriented in a first direction, and a plurality of bead stiffeners 205 oriented in a different direction. For example, each bead stiffener 203 is oriented along an associated axis 219, while each bead stiffener 205 is oriented along an associated axis 221. In the preferred embodiment, bead stiffeners 203 and 205 are oriented perpendicular to each other; however, other embodiments may include bead stiffeners 203 and 205 intersecting at an angle other than 90 degrees. It should be appreciated that bead stiffeners 203 may be formed in a variety of geometries. For example, bead stiffeners 203 may be rounded, circular, hat shaped, or of a customized contour, to name a few illustrative configurations. Further, the size and quantity of bead stiffeners 203 and 205 are implementation specific. In another embodiment, panel may include a plurality of bead stiffeners 203 and 205, the pitch of each stiffener 203 and 205 being tailored to redistribute the loads to the supporting structure. Further, a land area 223 located on a sheet 209 between bead stiffeners 203 and 205, may be machined, chemically milled, or otherwise altered to reduce the thickness. Further, a variety of features, such as holes, brackets, fairings, mating sheets, to name a few, may be included in panel 201.

Bead stiffeners 203 and 205 intersect at a joint 207. Joint 207 is configured with ah inverted pocket 225 having inverse pocket geometry so as to provide moment and stiffness continuity between bead stiffeners 203 and 205 across joint 207. As described further herein, the inverse pocket geometry across joint 207 provides improved load carrying capability and versatility of panel 201.

In the preferred embodiment, bead stiffeners 203 and 205, and joint 207 are integrally formed into sheet 209. Various manufacturing techniques can be suitable for forming bead stiffener 203, bead stiffener 205, and joint 207, into sheet 209. For example, bead stiffener 203, bead stiffener 205, and joint 207 may be formed in sheet 209 with a superplastic forming process. In such an embodiment, sheet 209 is preferably a metal having material properties suitable for the forming operation. Sheet 209 may be titanium alloy TI-6Al-4V or an aluminum alloy 7475, to non-restrictively name a few examples. In another embodiment, bead stiffeners 203, 205, and joint 207 are mechanically formed into sheet 209 through drop hammer, hydroforming, or a rubber pad forming operation, to non-restrictively name a few examples. An aluminum alloy 6013 T4 may be a suitable material for such a mechanical forming operation.

Further, bead stiffener 203, bead stiffener 205, and joint 207 of panel 201 may be molded in a molding operation. For example, panel 201 may be molded in a compression molding operation using composite material. For example, a carbon/epoxy molding compound may be used to compression mold panel 201. Further, panel 201 may be molded out of any variety of materials, such as plastic, polymers, fiber/resin systems, glass, metal, or ceramic, to non-restrictively name a few.

Further, panel 201 may be formed in a composite dry or wet lay-up procedure. For example, pre-impregnated ply is composite material may be layed-up on a tooled surface. In another embodiment, dry composite material is layed onto a tooled surface, and then resin is transferred around the dry composite fibers. Such a procedure may be referred to as resin transfer molding (RTM) or vacuum assisted resin transfer molding (VARTM).

It should be appreciated that a wide variety of manufacturing processes known in the art may be used to fabricate panel 201. The desired manufacturing process is dependent upon the specific implementation of panel 201. Further, it should be appreciated that panel 201 may be manufactured in a wide variety of shapes, geometries, contours, etc., that may be easily scaled to satisfy various design criteria. Further, panel 201 may be have greater or fewer features depending on the specific implementation.

Referring now to FIGS. 7-18, a series of sectional views of joint 207 are illustrated to more particularly illustrate how joint 201 is configured with inverted pocket 225 having inverse pocket geometry so as to provide moment and stiffness continuity between bead stiffeners 203 and 205. Joint 207 is configured with inverted pocket 225 so that the area moment of inertia across the cross section is maintained so as to provide continual resistance to deflection. Further, maintaining the area moment of inertia across joint 207 generates stiffness continuity across joint 207, thereby producing a more structurally efficient panel.

Figure 8:
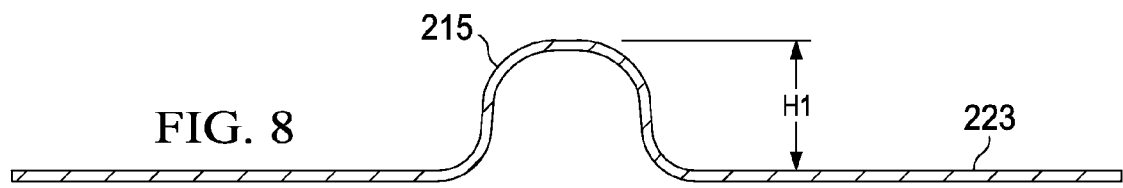
FIG. 8 is a cross-sectional view of the joint taken from section lines VIII-VIII in FIG. 7, according to the preferred embodiment of the present application.
Figure 9:
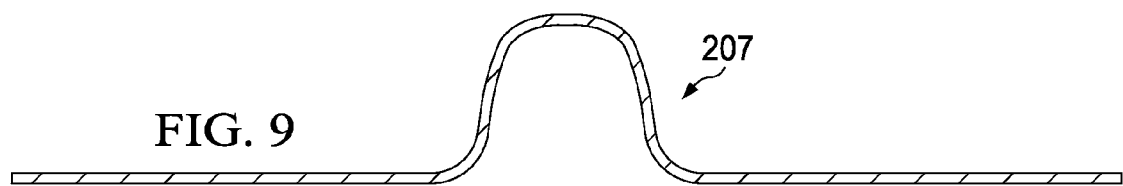
FIG. 9 is a cross-sectional view of the joint taken from section lines IX-IX in FIG. 7, according to the preferred embodiment of the present application.
Figure 10:
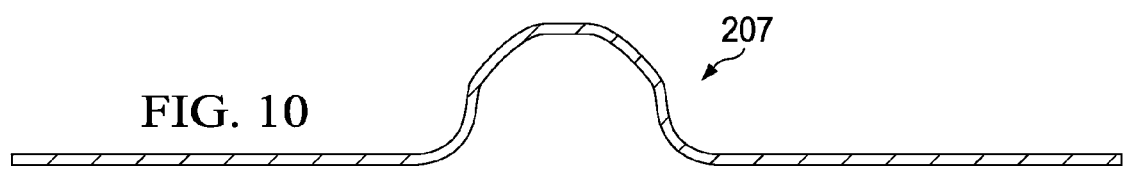
FIG. 10 is a cross-sectional view of the joint taken from section lines X-X in FIG. 7, according to the preferred embodiment of the present application.
Figure 11:
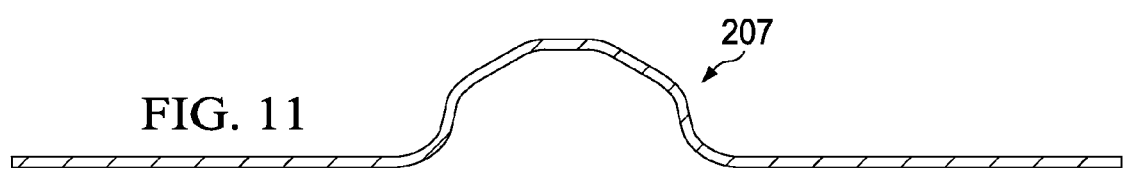
FIG. 11 is a cross-sectional view of the joint taken from section lines XI-XI in FIG. 7, according to the preferred embodiment of the present application.
Figure 12:
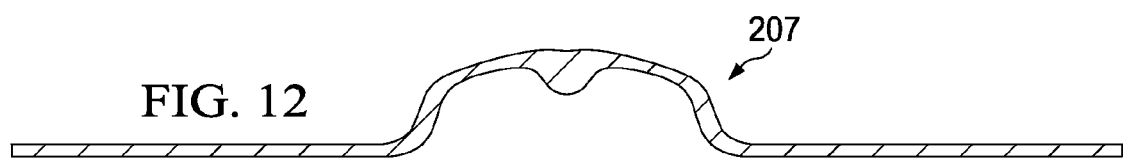
FIG. 12 is a cross-sectional view of the joint taken from section lines XII-XII in FIG. 7, according to the preferred embodiment of the present application.
Figure 13:
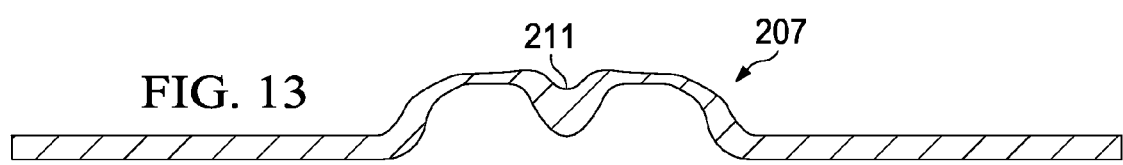
FIG. 13 is a cross-sectional view of the joint/taken from section lines XIII-XIII in FIG. 7, according to the preferred embodiment of the present application.
Figure 14:
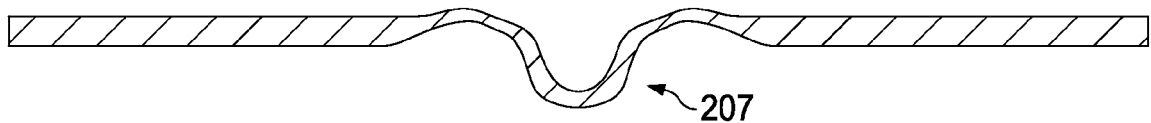
FIG. 14 is a cross-sectional view of the joint taken from section lines XIV-XIV in FIG. 7, according to the preferred embodiment of the present application.
Figure 15:
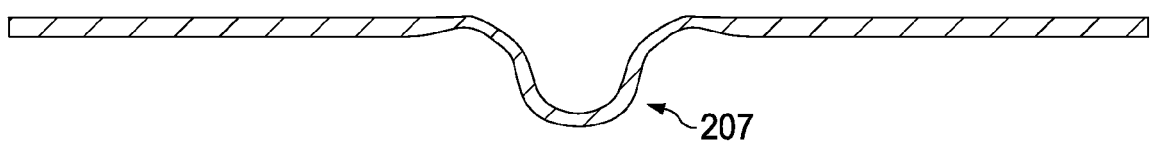
FIG. 15 is a cross-sectional view of the joint taken from section lines XV-XV in FIG. 7, according to the preferred embodiment of the present application.
Figure 16:
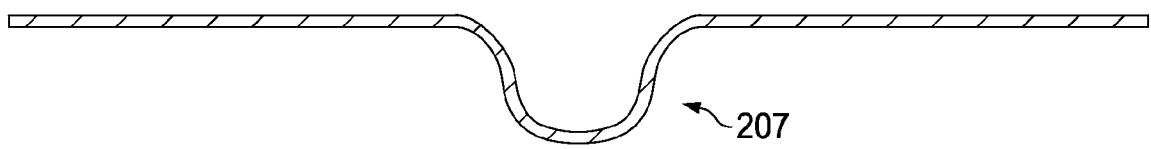
FIG. 16 is a cross-sectional view of the joint taken from section lines XVI-XVI in FIG. 7, according to the preferred embodiment of the present application.
Figure 17:
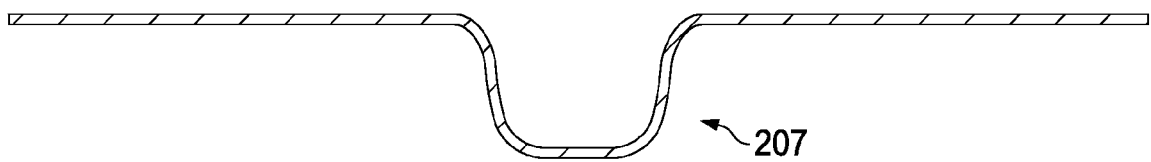
FIG. 17 is a cross-sectional view of the joint taken from section lines XVII-XVII in FIG. 7, according to the preferred embodiment of the present application.
Figure 18:
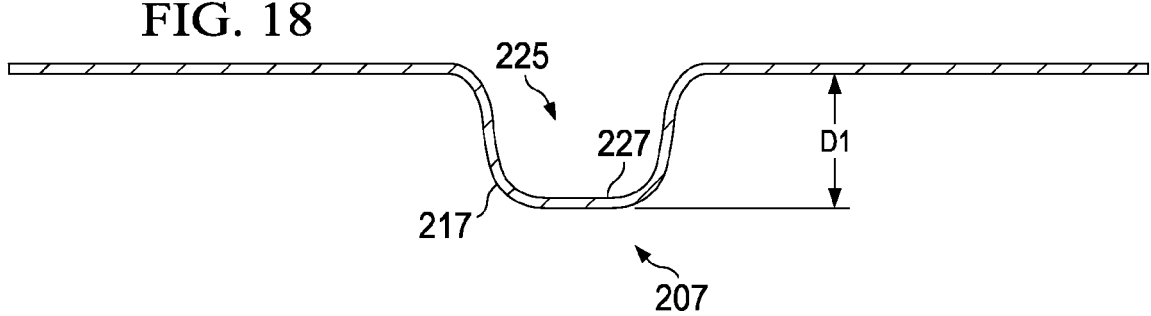
FIG. 18 is a cross-sectional view of the joint taken from section lines XVIII-XVIII in FIG. 7, according to the preferred embodiment of the present application.
Figure 19:
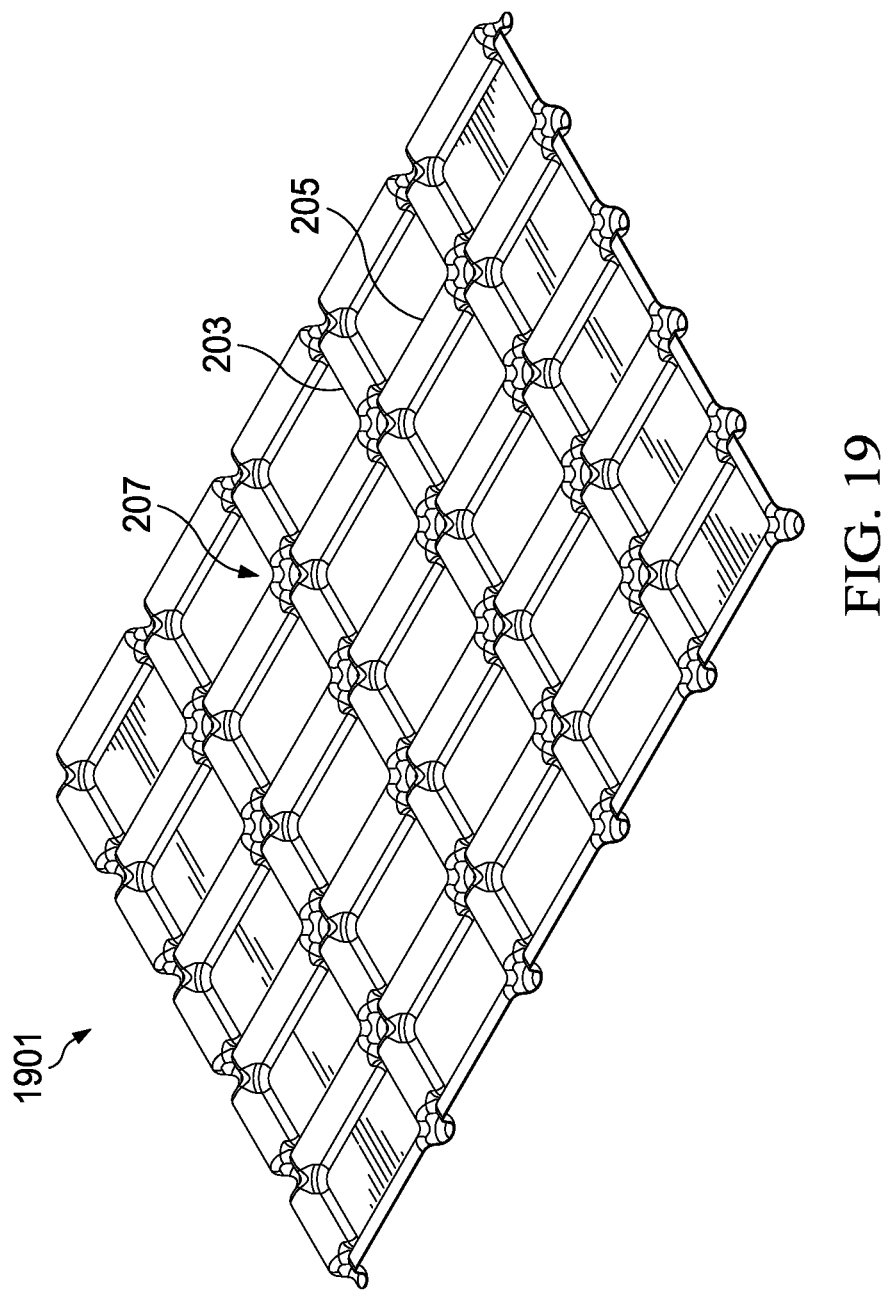
FIG. 19 is a perspective view of a panel, according to ah alternative embodiment of the present application.
Figure 20:
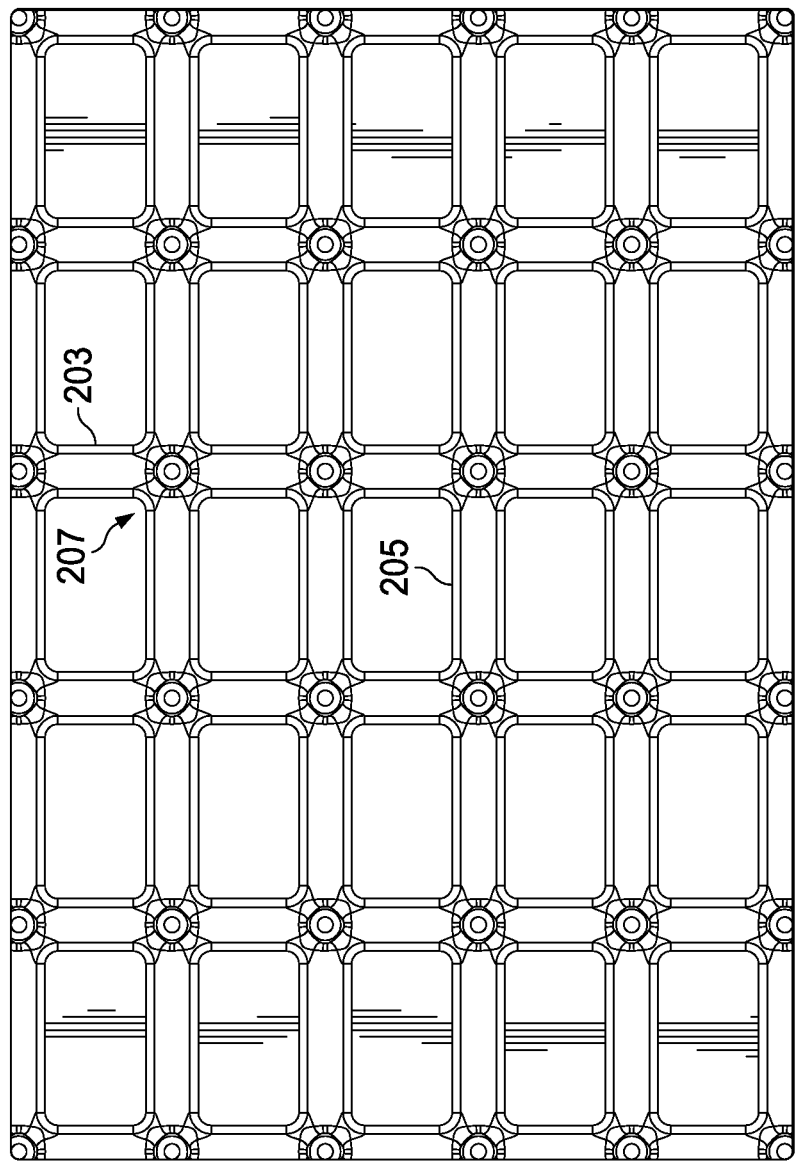
FIG. 20 is a top view of the integrally stiffened panel from FIG. 19, according to ah alternative embodiment of the present application.
Figure 21:
FIG. 21 is a front view of the integrally stiffened panel from FIG. 19, according to an alternative embodiment of the present application.
Figure 22:
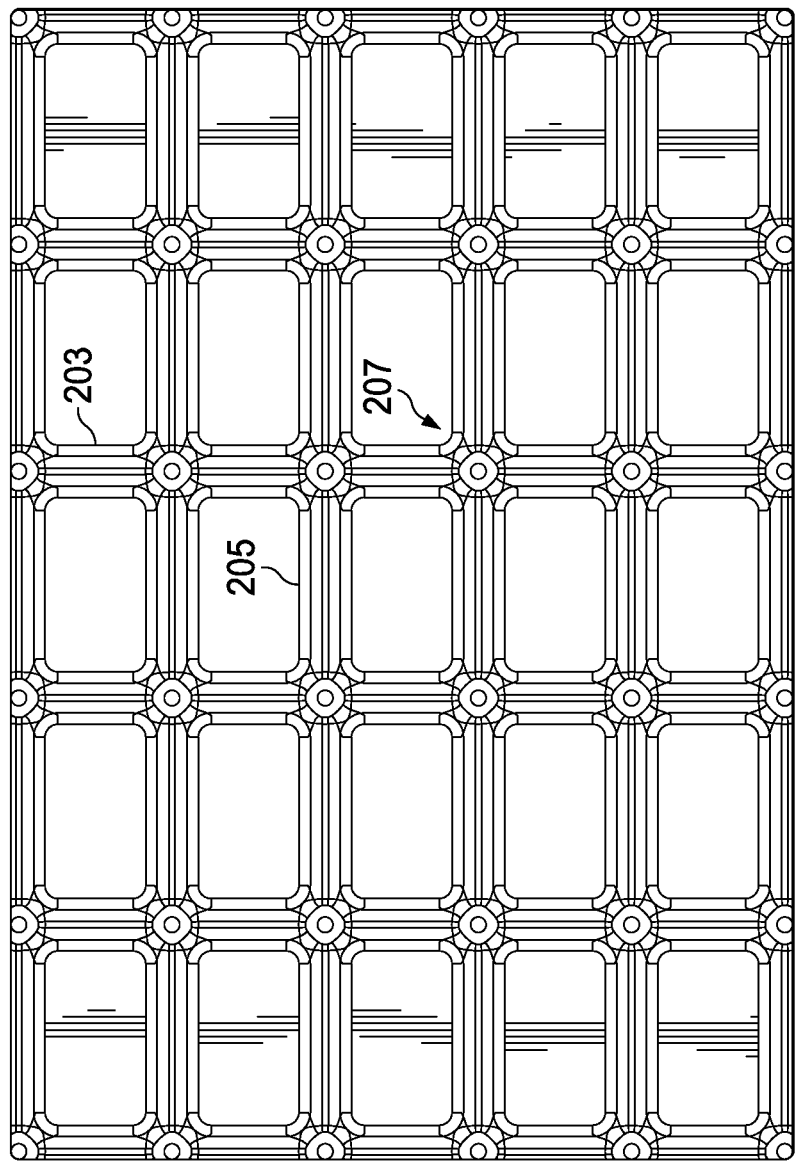
FIG. 22 is a bottom view of the integrally stiffened panel from FIG. 19, according to an alternative embodiment of the present application.
Figure 23:
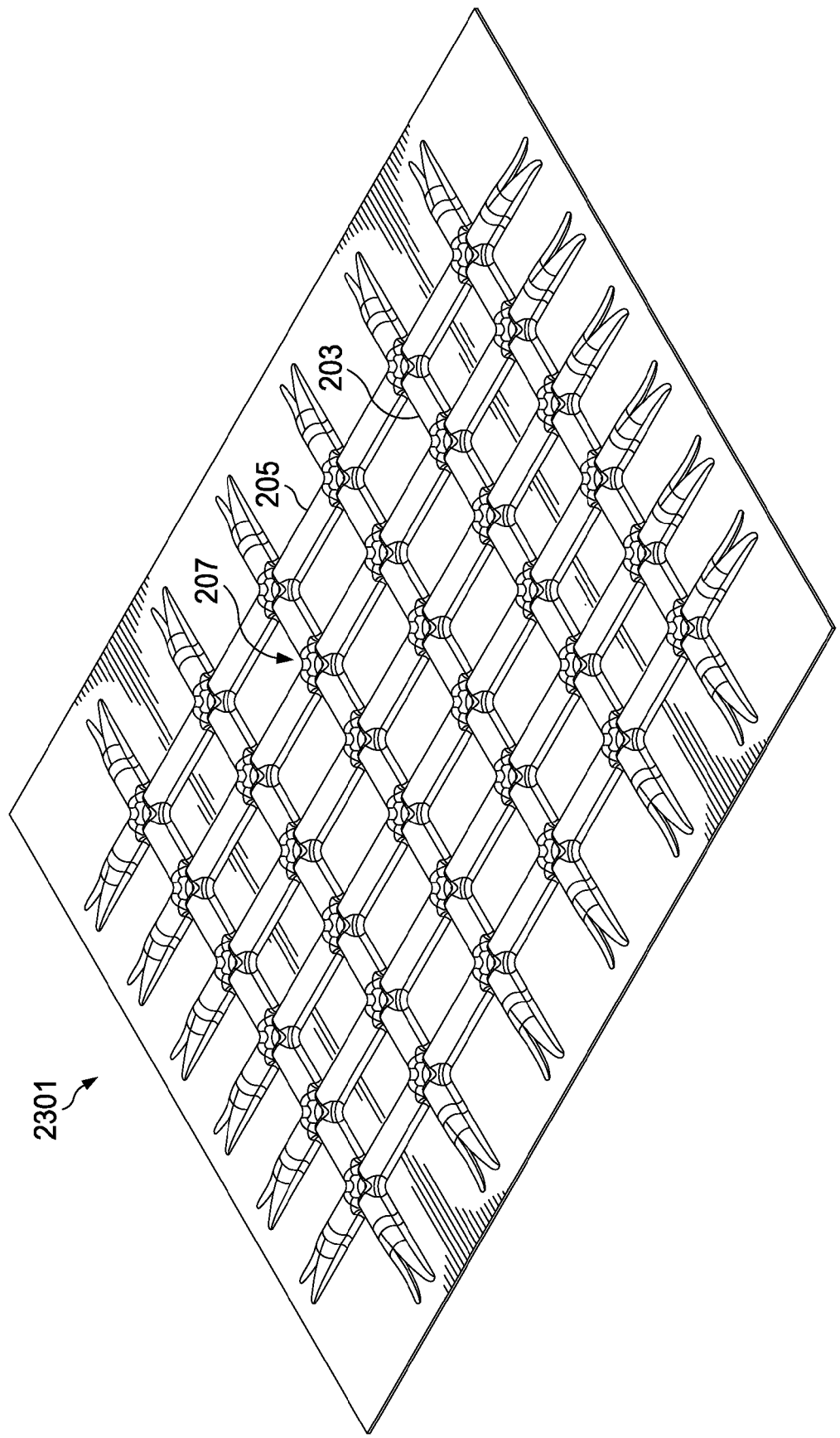
FIG. 23 is a perspective view of an integrally stiffened panel, according to an alternative embodiment of the present application.
Figure 24:
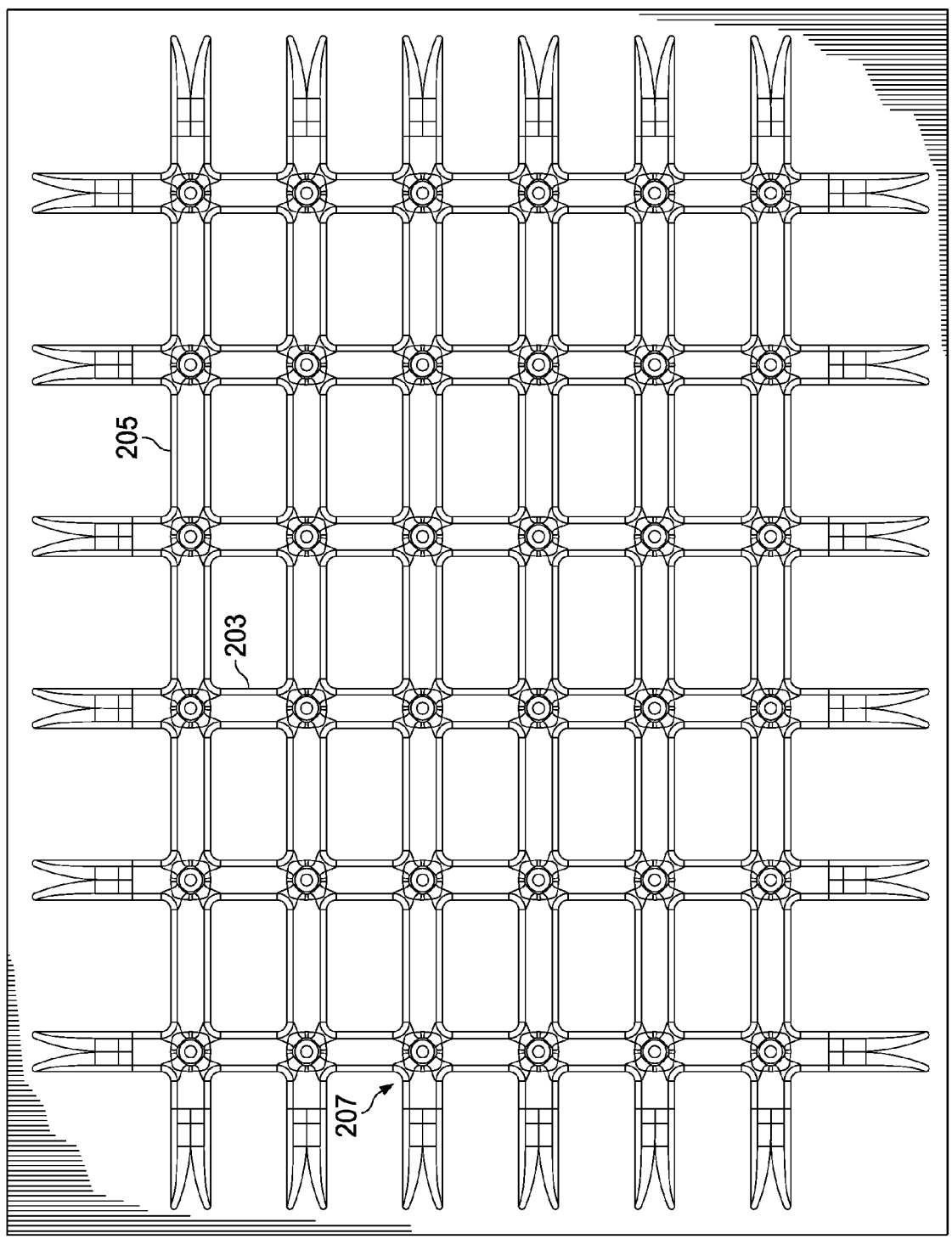
FIG. 24 is a top view of the integrally stiffened panel from FIG. 23, according to an alternative embodiment of the present application.
Figure 25:
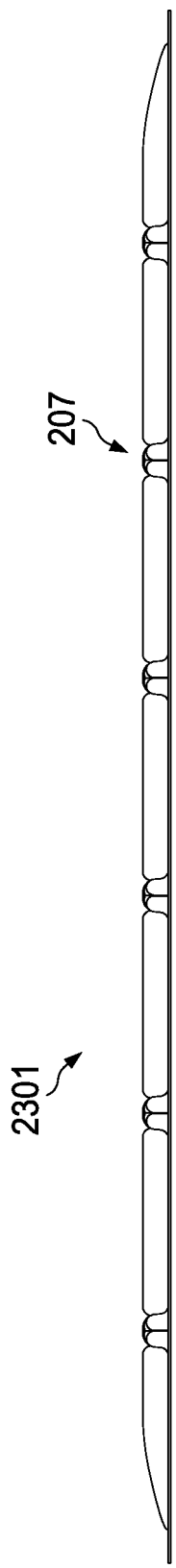
FIG. 25 is a front view of the integrally stiffened panel from FIG. 23, according to an alternative embodiment of the present application.
Figure 26:
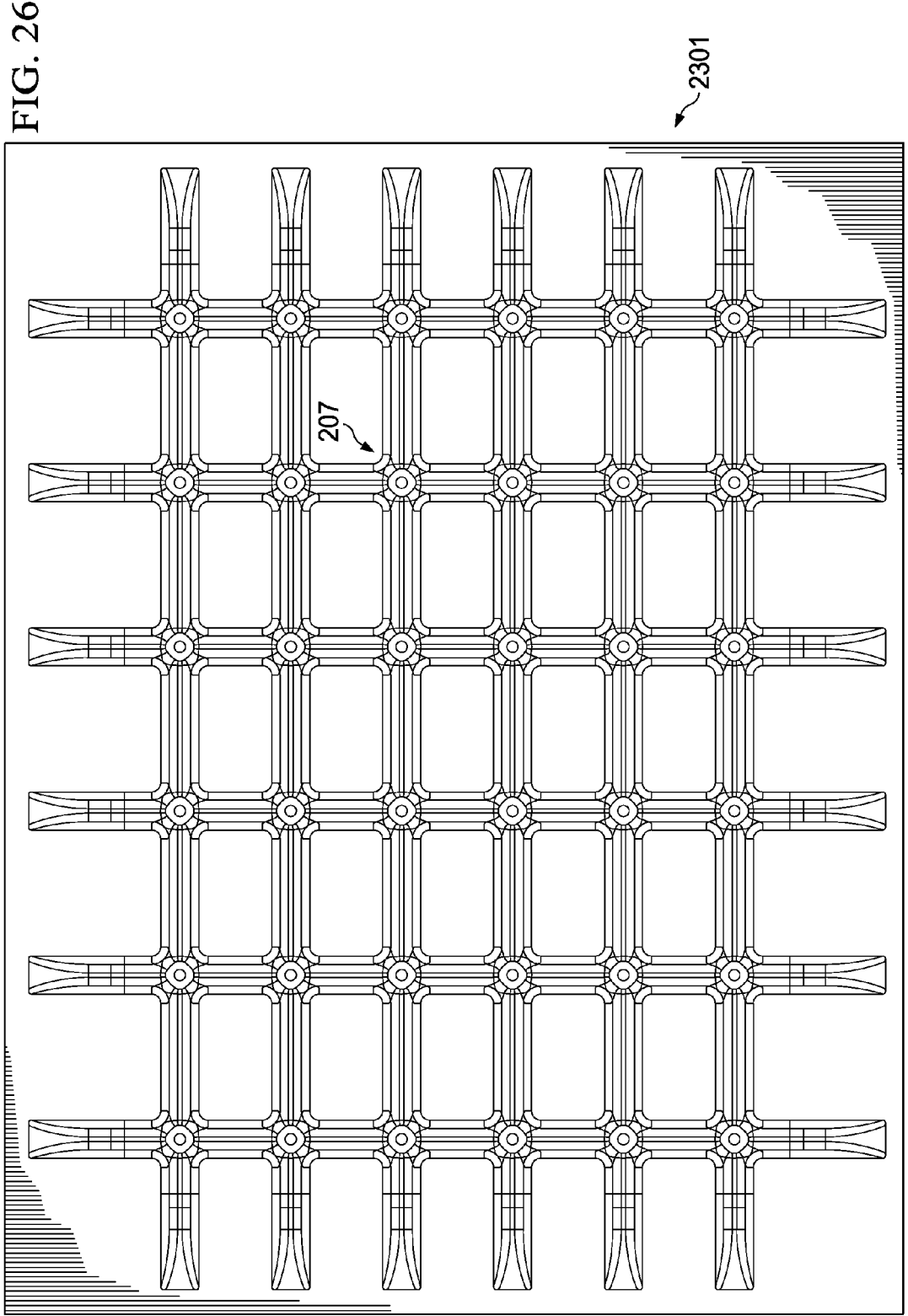
FIG. 26 is a bottom view of the integrally stiffened panel from FIG. 23, according to an alternative embodiment of the present application.
Figure 27:
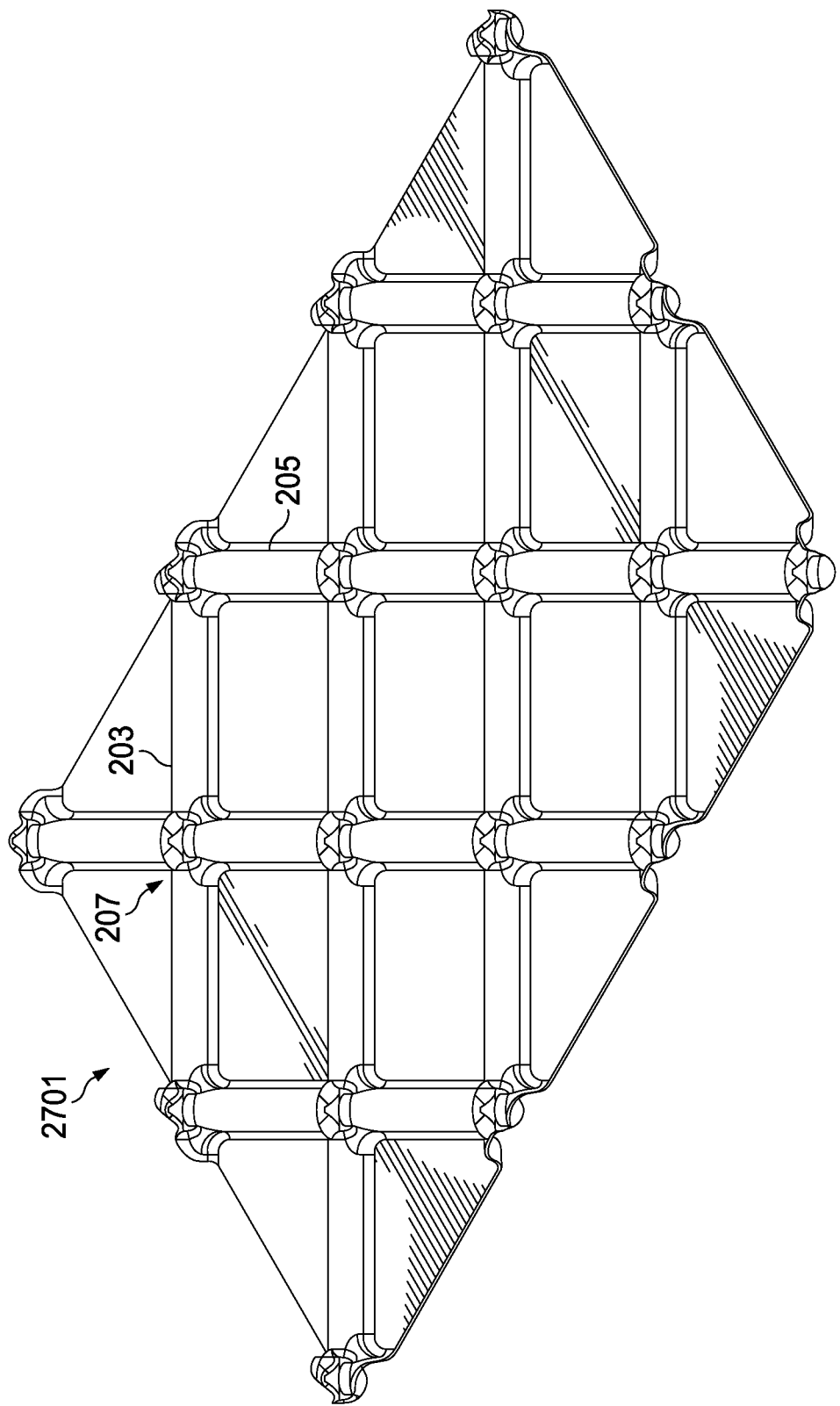
FIG. 27 is a perspective view of an integrally stiffened panel, according to an alternative embodiment of the present application.
Figure 28:
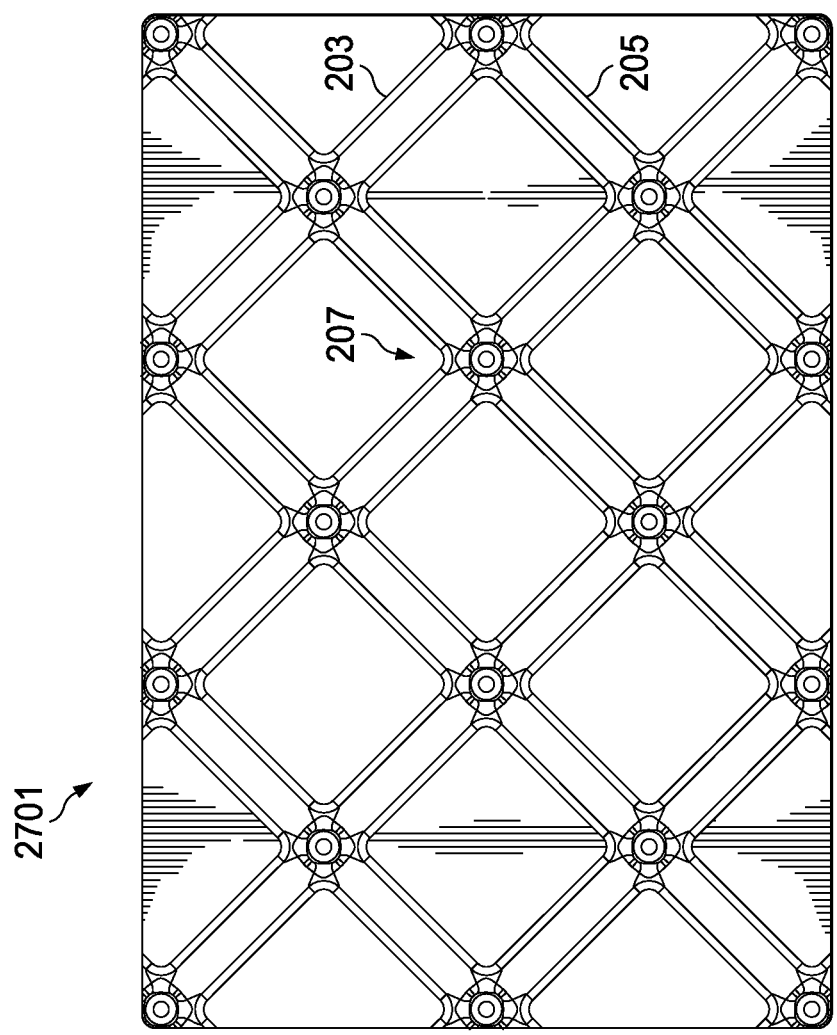
FIG. 28 is a top view of the integrally stiffened panel from FIG. 27, according to an alternative embodiment of the present application.
Figure 29:
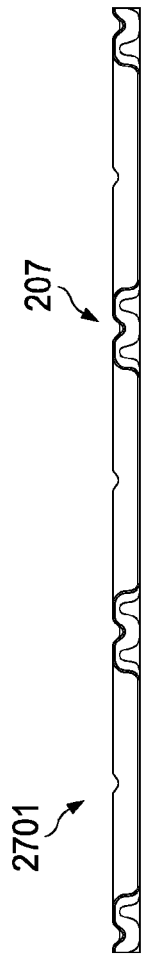
FIG. 29 is a front view of the integrally stiffened panel from FIG. 27, according to an alternative embodiment of the present application.
Figure 30:
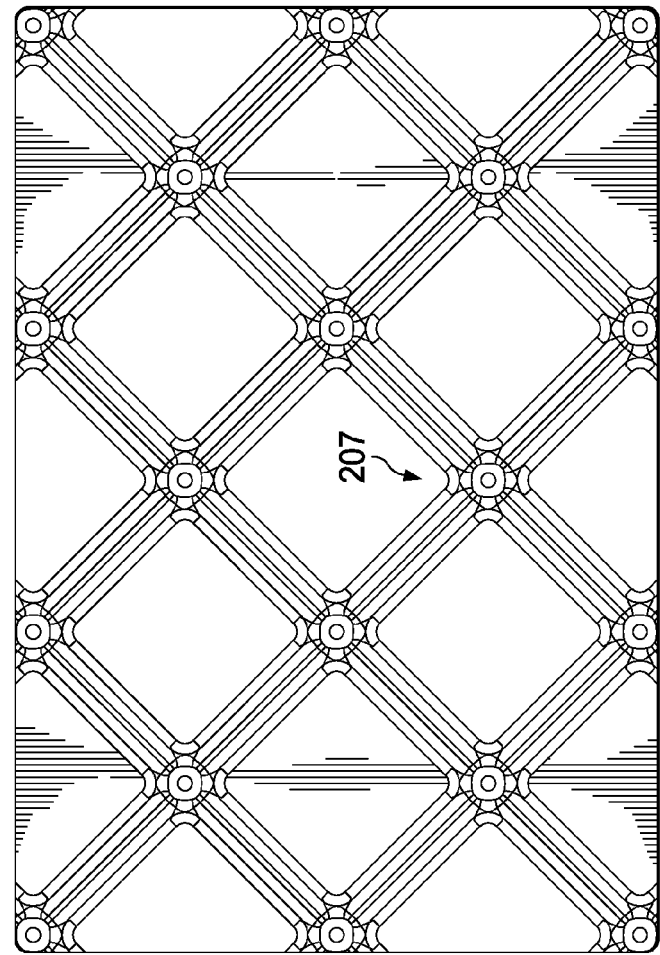
FIG. 30 is a bottom view of the integrally stiffened panel from FIG. 27, according to an alternative embodiment of the present application.
Figure 31:
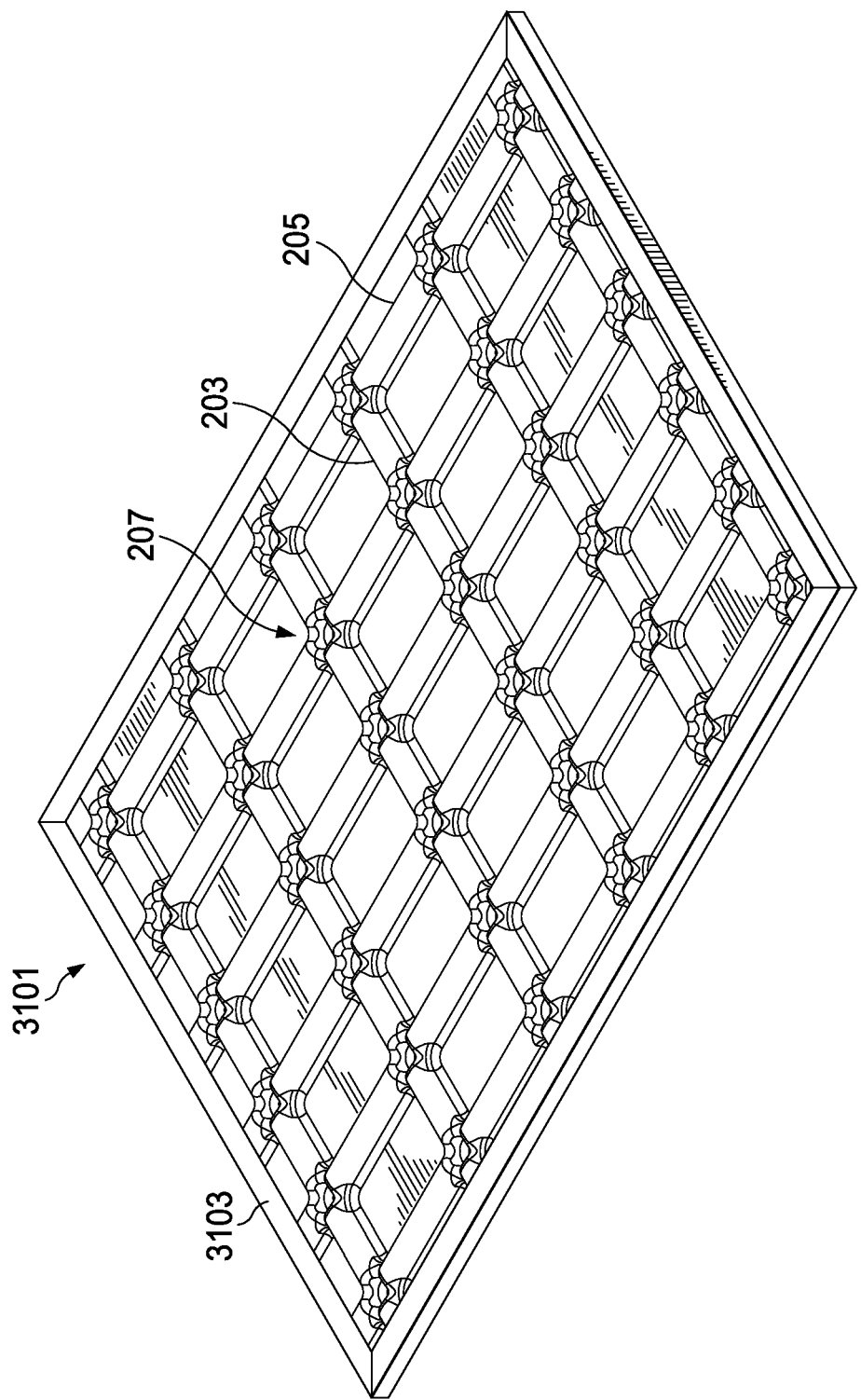
FIG. 31 is a perspective view of an integrally stiffened panel, according to art alternative embodiment of the present application.
Figure 32:
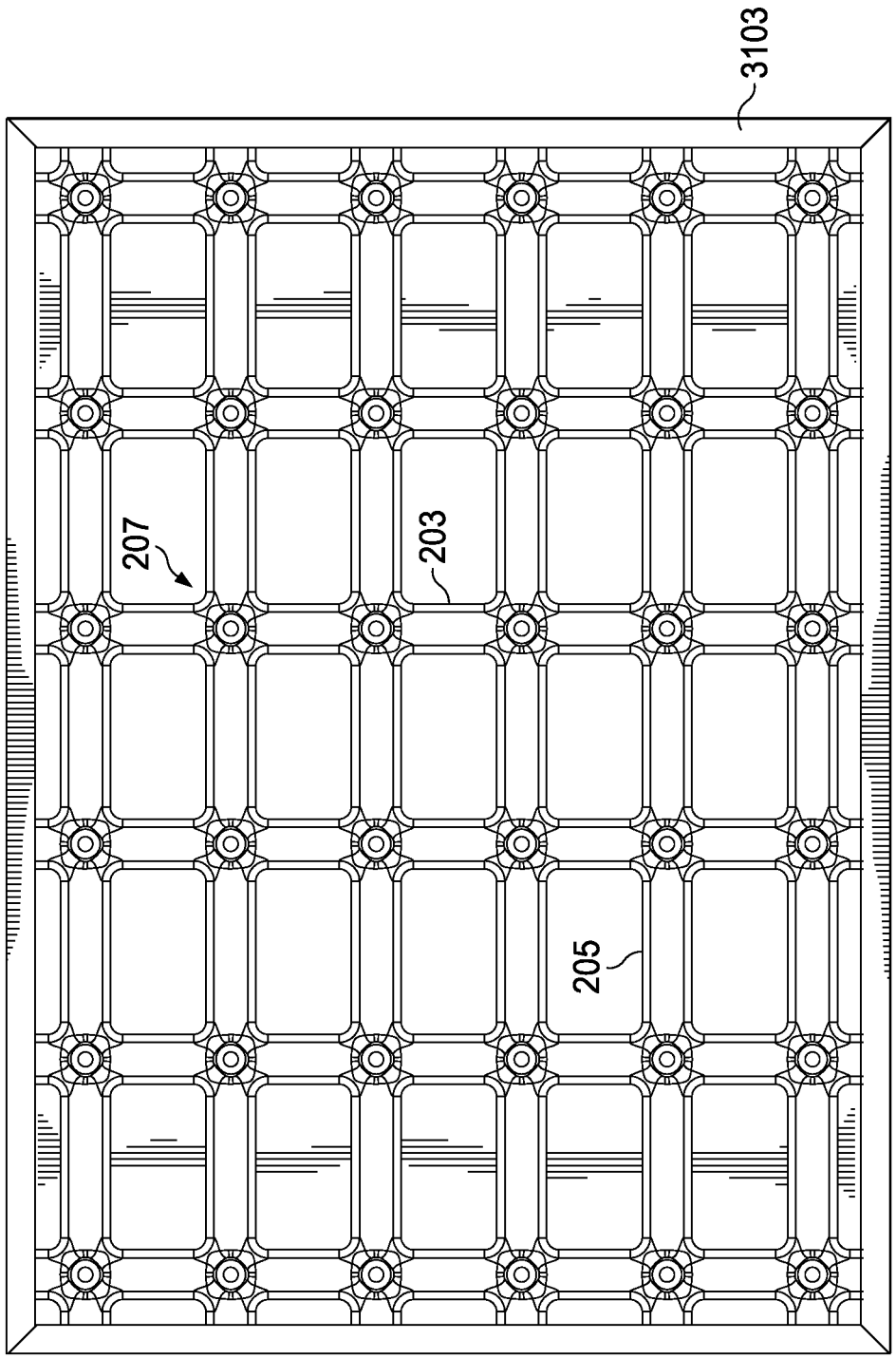
FIG. 32 is a top view of the integrally stiffened panel from FIG. 31, according to an alternative embodiment of the present application.
Figure 33:
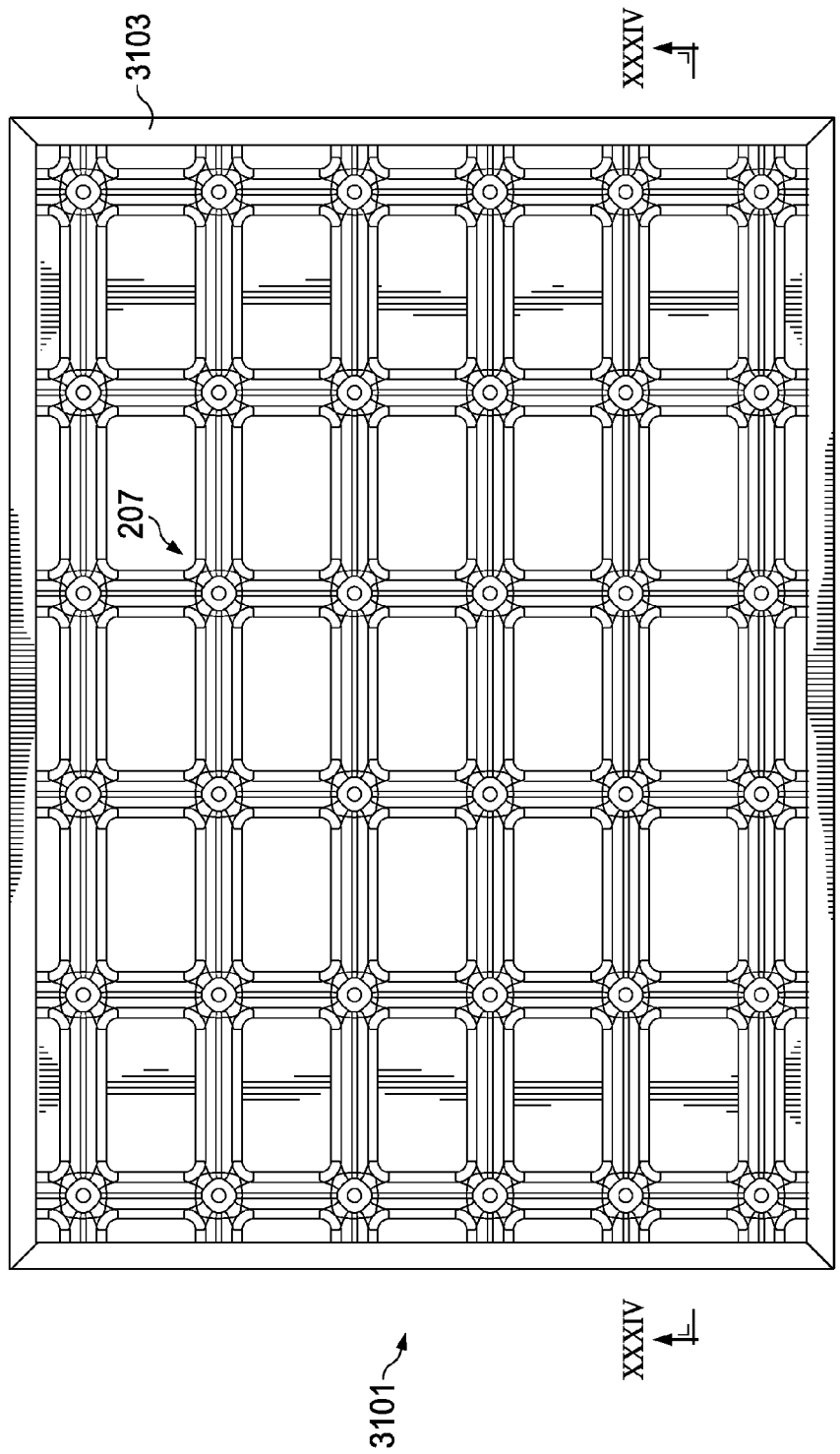
FIG. 33 is a bottom view of the integrally stiffened panel from FIG. 31, according to an alternative embodiment of the present application.
Figure 34:
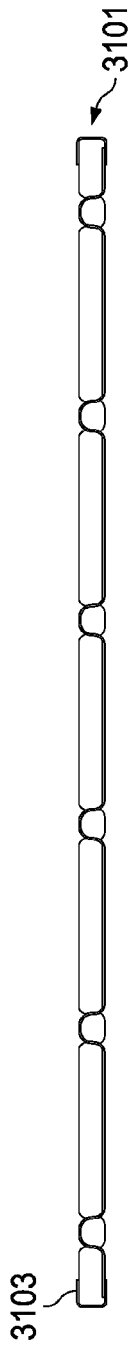
FIG. 34 is a cross-sectional view of the joint taken from section lines XXXIV-XXXIV in FIG. 33, according to an alternative embodiment of the present application.
Figure 35:
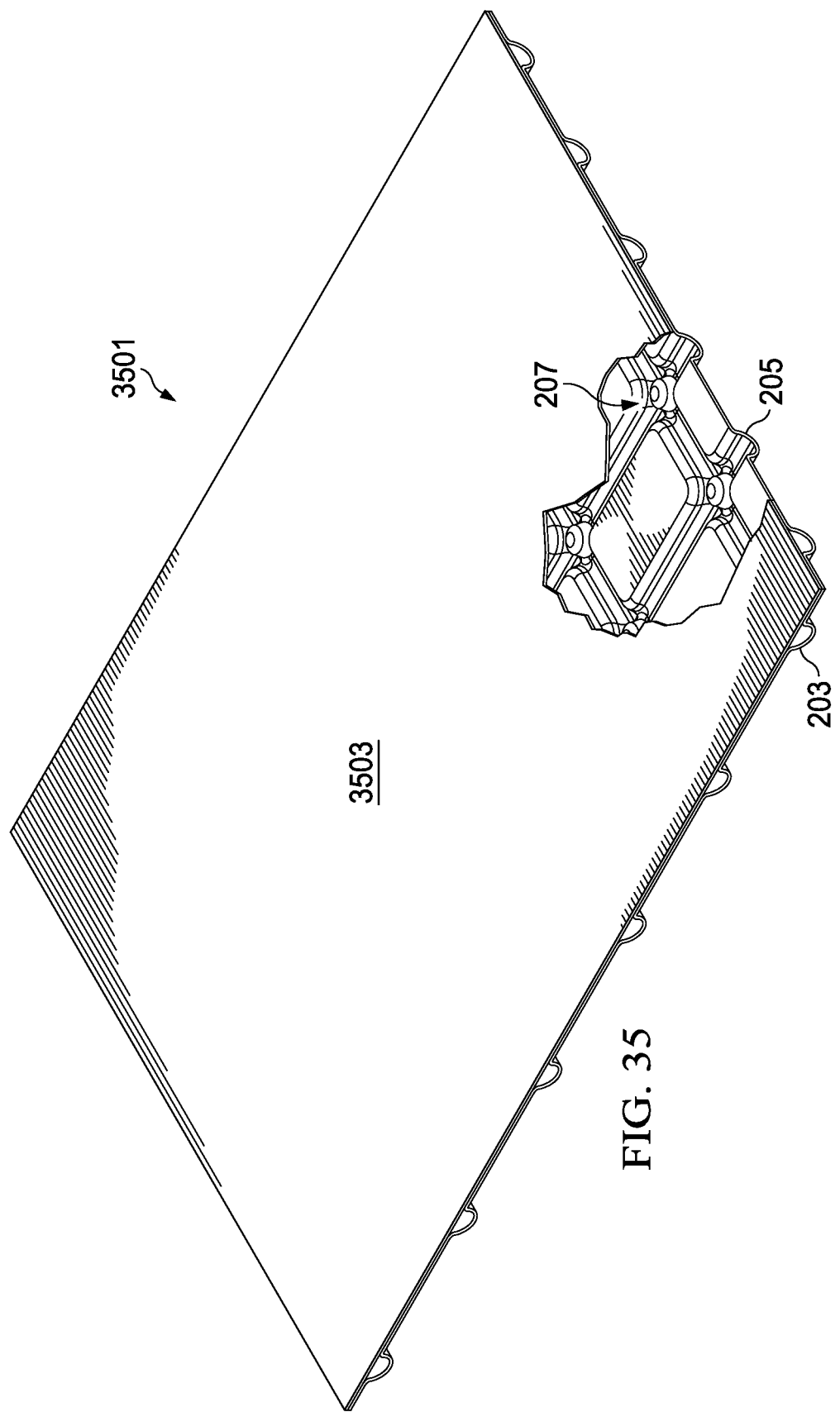
FIG. 35 is a perspective view of an integrally stiffened panel, according to an alternative embodiment of the present application.
Figure 36:
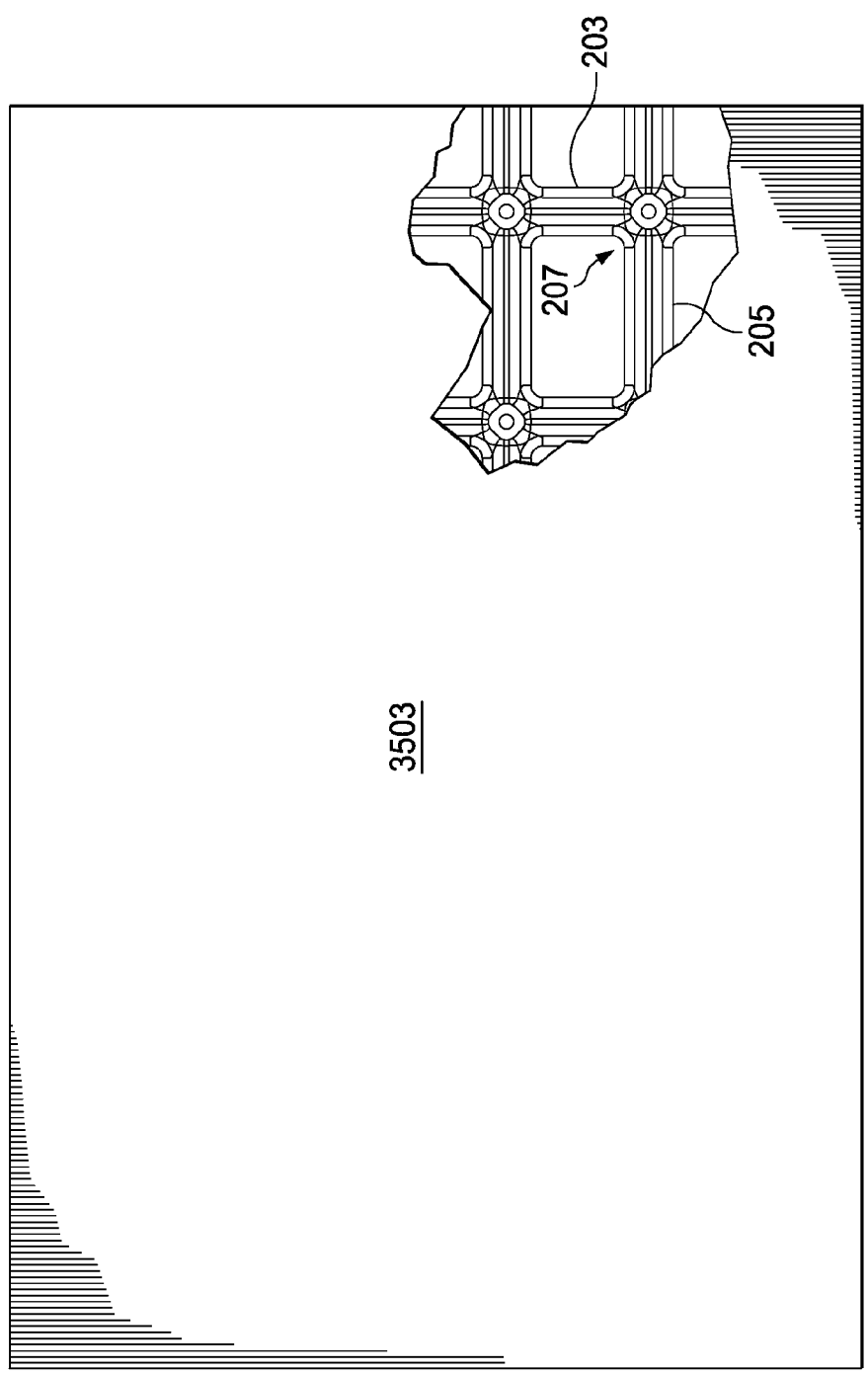
FIG. 36 is a top view of the integrally stiffened panel from FIG. 35, according to an alternative embodiment of the present application.
Figure 37:
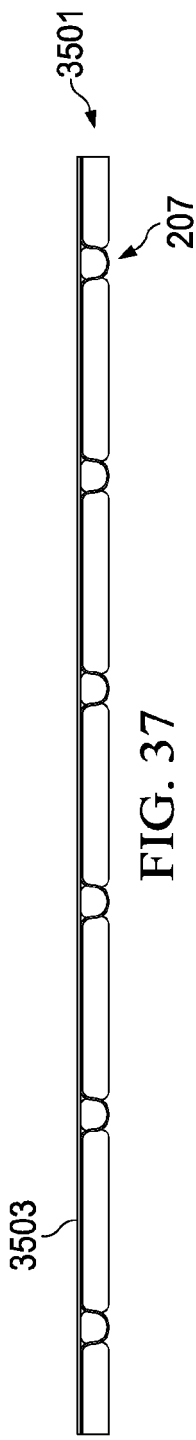
FIG. 37 is a front view of the integrally stiffened panel from FIG. 35, according to an alternative embodiment of the present application.
Figure 38:
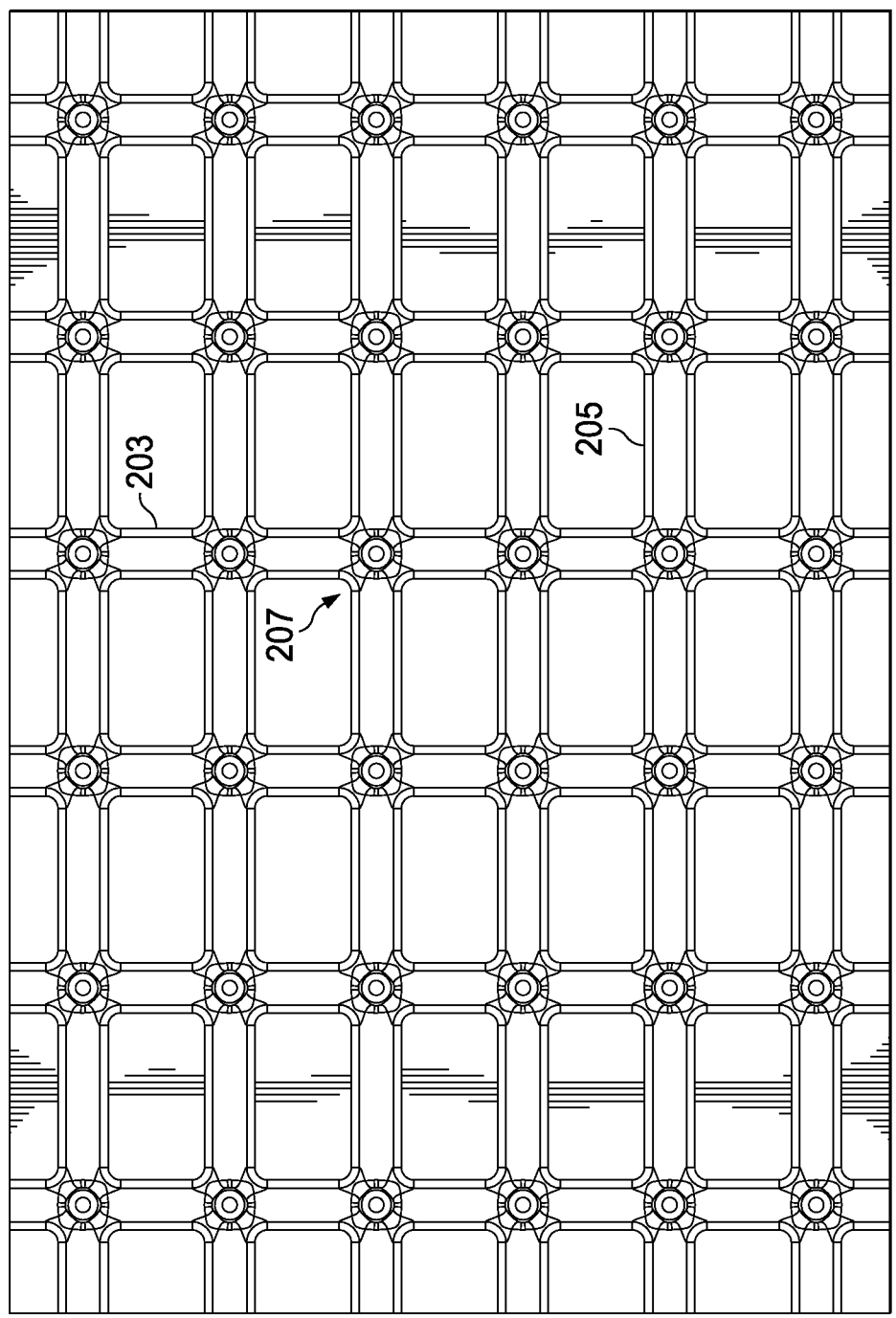
FIG. 38 is a bottom view of the integrally stiffened panel from FIG. 35, according to an alternative embodiment of the present application.

Still referring to FIGS. 7-18, the geometry of joint 207 inverts from a convex portion 215 of bead stiffeners 203 and 205, into a concave, portion 217 at the middle of joint 207. For example, FIG. 8 illustrates a sectional view across bead stiffener 203, the bead stiffener having a height H1, as measured from the surface of land area 223 of sheet 209. Height H1 represents the height of stiffener 203 prior to the intersection with stiffener 205 at joint 207. As shown in FIGS. 7-18, the geometry of joint 207 progressively inverts from an outer portion to a center portion of the joint, inversion of the joint first manifests at an initial inversion 211 of joint 207, and proceeds to invert until fully inverted in the middle of inverted pocket 225 of joint 207. For example, FIG. 18 illustrates a sectional view across a center of joint 207, the sectional view taken along axis 221 of stiffener 205. Concave portion 217 of joint 207 has a depth D1, as measured from an upper geometry of bead stiffener 205. The magnitude of depth D1 can be dependent upon the material of sheet 209, as well as the implementation specific manufacturing process used to create panel 201. As shown in FIG. 7-18, the geometry of joint 207 maintains a contour across the joint that generates stiffness. The inverted pocket 225 can have a pocket surface 227 that is generally parallel to the surface of land area 223. The geometry of joint 207 includes radii 213 to facilitate transitions across joint 207. It should be appreciated that even though section views in FIGS. 8-18 are taken across the transition of bead stiffener 203 into the inverted pocket 225 of joint 207, joint 207 is preferably symmetric in that section views in FIGS. 8-18 also resemble the geometry of the transition of bead stiffener 205 into the inverted pocket 225 of joint 207.

Referring now to FIGS. 19-22, an alternative embodiment panel 1901 is illustrated. Panel 1901 is substantially similar to panel 201, except the outer edges traverse through bead stiffener 203, bead stiffener 205, and joints 207. Such a configuration provides enhanced installation support capabilities of panel 1901 to a frame and/or adjoining structure. It should be appreciated that the edge geometry of panel 1901 may selectively traverse only a few selected stiffeners 203, stiffeners 205, and joints 207.

Referring now to FIGS. 23-26, an alternative embodiment panel 2301 is illustrated. Panel 2301 is substantially similar to panel 201, except bead stiffeners 203 and 205 run out before reaching the edge profile. Panel 2301 is illustrative of a configuration particularly well suited to applications where installation space is limited. In such a configuration, an edge doubler may be used to provide edge stiffness. Panel 2301 may be attached to adjoining structure via any variety of structural configurations, such as a frame, brackets, adapters, to name a few.

Referring now to FIGS. 27-30, an alternative embodiment panel 2701 is illustrated. Panel 2701 is substantially similar to panel 201, except bead stiffeners 203 and 205 are oriented at a bias to provide added resistance to shear deformation by delaying the onset of shear buckling. In the illustrated embodiment, bead stiffeners 203 and 205 are oriented at a 45 degree angle to the edges. Panel 2701 can have improved shear strength and stiffness compared to panel 201. As such, panel 2701 is particularly desirable in situations where the principal design load is in-plane shear.

Referring now to FIGS. 31-34, an alternative embodiment panel 3101 is illustrated. Panel 3101 is substantially similar to panel 201, except for also having a frame 3103. Frame 3103 is coupled to the edge portions in order to provide edge support as well as a structure for attaching panel 3101 to adjoining structure. In an aircraft application, frame 3103 may have a contour of the interior surface of a fuselage. In such a configuration, panel 3101 may be a bulkhead. It should be appreciated that even though frame 3103 is depicted as having a "C" shaped cross-section, frame 3103 may be any suitable cross-sectional shape, such "T" shaped, for example.

Referring to FIGS. 35-38, an alternative embodiment panel 3501 is illustrated. Panel 3501 is substantially similar to panel 201, except for also having a supplemental skin 3503. In an aircraft application, skin 3503 may be ah aerodynamically contoured outer skin of an aircraft, and as such, may be integrated into body, wing, sponson, tailboom, nacelle, cowling, and empennage structure, to name a few examples. In an automobile application, skin 3503 may be an outer skin of a door, hood, trunk, fender, roof, to name a few examples. Skin 3503 may be attached using a number of different methods, such as bonding, welding, riveting, fastening, to name a few.

It should be the appreciated the illustrated panels, such as panels 201, 1901, 2301, 2701, 3101, and 3501, are merely exemplary of a wide variety of configurations. For clarity, the panels are illustrated as being planar; however, it should be appreciated that the panels may be configured in a variety of contours and geometries. Further, the quantity, size, and geometric scale of each joint 207 are implementation specific.

The integrally stiffened panel 201, and alternative embodiments, not only provide stiffness continuity across the joint, but also includes other benefits. For example, panel 201 is configured with multiple load paths which improve tolerance of the panel to damage from accidental impact, ballistics, corrosion, fatigue, to name a few. As such, panel 201 may be particularly well suited to integration in a ballistic armor plate. Further, panel 201 may be incorporated in structural and non-structural applications. Panel 201 may also be incorporated into building and home construction as a sheet metal in exterior and interior applications. Panel 201 may also be incorporated in spacecraft, satellites, ground vehicles, air vehicles, to name a few.

The unique configuration of panel 201 is also particularly well suited for acoustic noise suppression and dampening. In such an embodiment, gaps and spaces in panel 201 may be filled with an acoustical foam or blanket.

Figure 39:
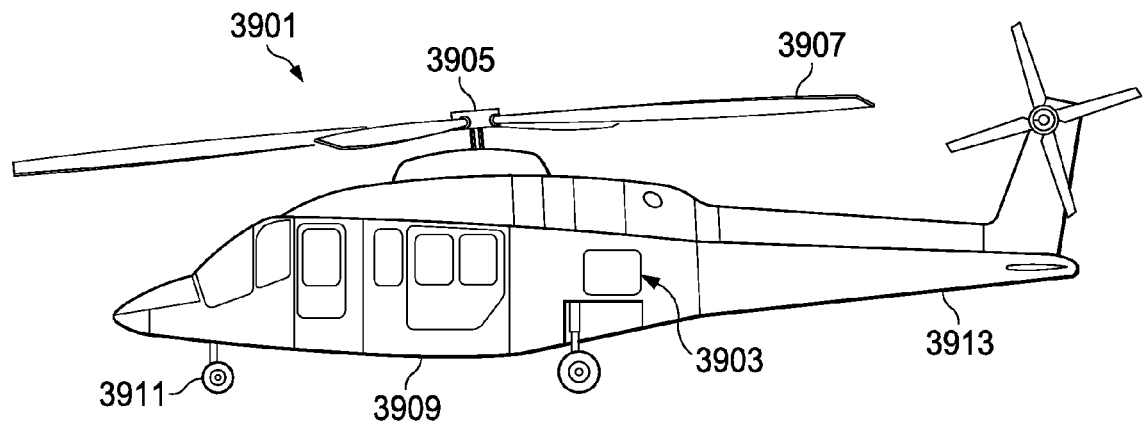
FIG. 39 is a side view of an aircraft having an integrally stiffened panel, according to an illustrative embodiment of the present application.

Referring now to FIG. 39 in the drawings, a rotorcraft 3901 is illustrated. Rotorcraft 3901 has a rotor system 3905 with a plurality of rotor blades 3907. The pitch of each rotor blade 3907 can be selectively controlled in order to selectively control direction, thrust, and lift of rotorcraft 3901. Rotorcraft 3901 further includes a fuselage 3909, landing gear 3911, and an empennage 3913. Rotorcraft 3901 is illustrative of an aircraft that can include one or more members having integral stiffeners that intersect at a joint, the joint having inverted geometry across the transition joint at the intersection of the stiffeners.

Figure 40:
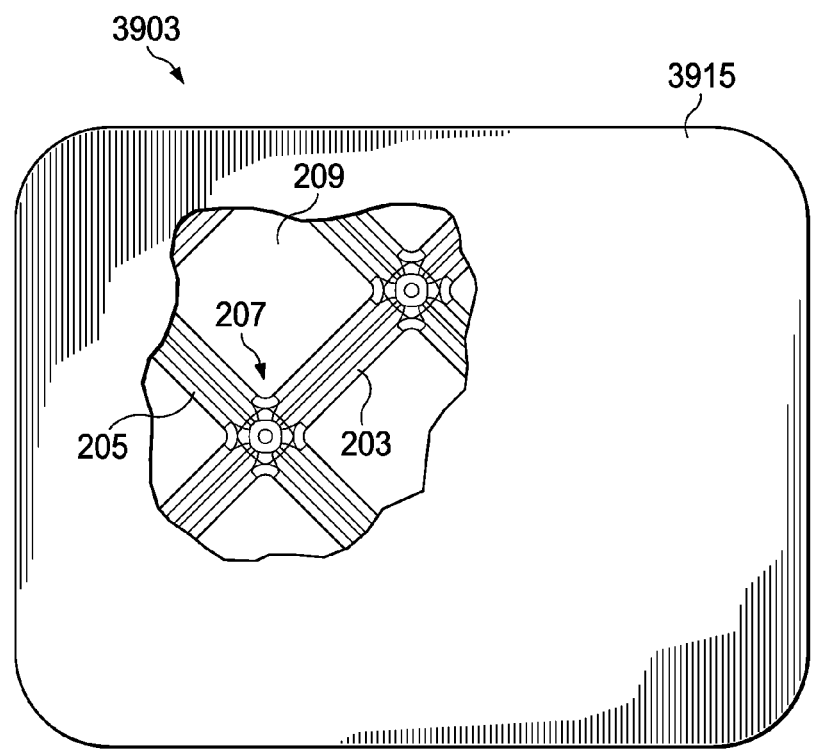
FIG. 40 is a detail view of the integrally stiffened panel, from FIG. 39, according to an illustrative embodiment of the present application.

Referring now also to FIG. 40, a door member 3903 is illustrative of an aircraft member having integral stiffeners that intersect at a joint, the joint having inverted geometry across the transitional intersection of the stiffeners. Door member 3903 is an illustrative aircraft embodiment of panel 3501 shown in FIGS. 35-38. Door member 3903 includes an exterior skin 3915 having the exterior mold line contour of rotorcraft 3901. Door member 3903 includes an integrally stiffened panel 201 having bead stiffeners 203 and 205 integral to sheet 209, the bead stiffeners 203 and 205 intersect at a joint 207, as described further herein. Standard hardware (e.g., hinges, handles, etc.) associated with door member 3903 are not shown for clarity. It should be appreciated that door member 3903 is merely illustrative of the wide variety of aircraft structures that can include an integrally stiffened panel 201. For example, as a load bearing structure internal to the aircraft, panel 201 would not typically require adding a skin surface. A load bearing structure internal to the aircraft can be a firewall, engine deck, bulkhead, or tailboom frame, to name a few examples.

Figure 6:
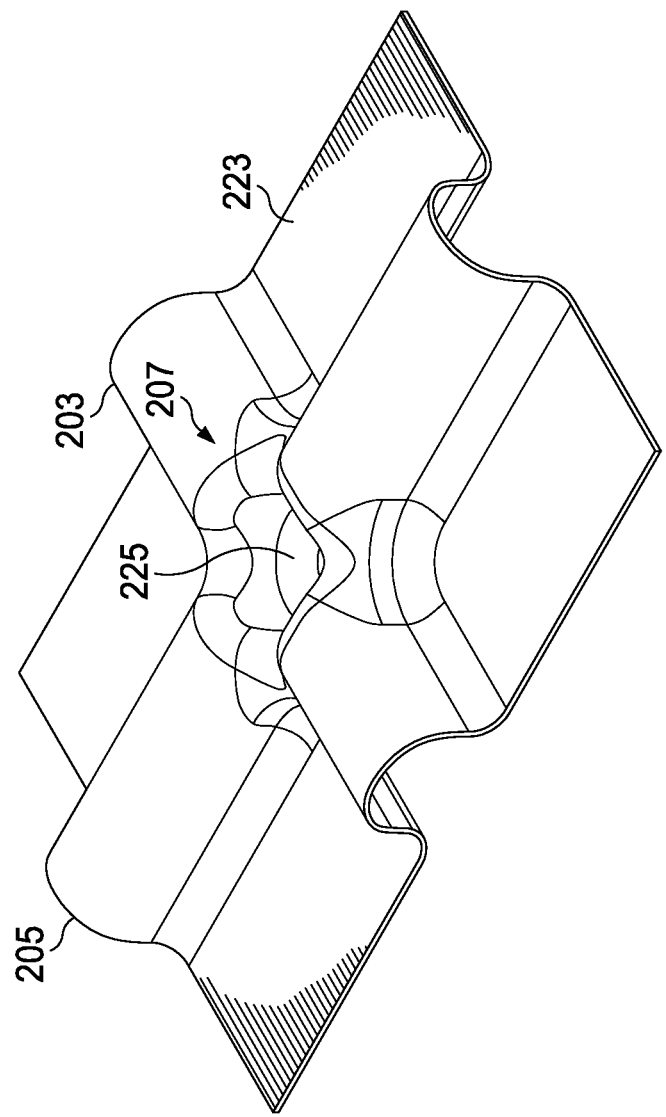
FIG. 6 is a perspective view of a joint from the panel of FIG. 2, according to the preferred embodiment of the present application.
Figure 5:
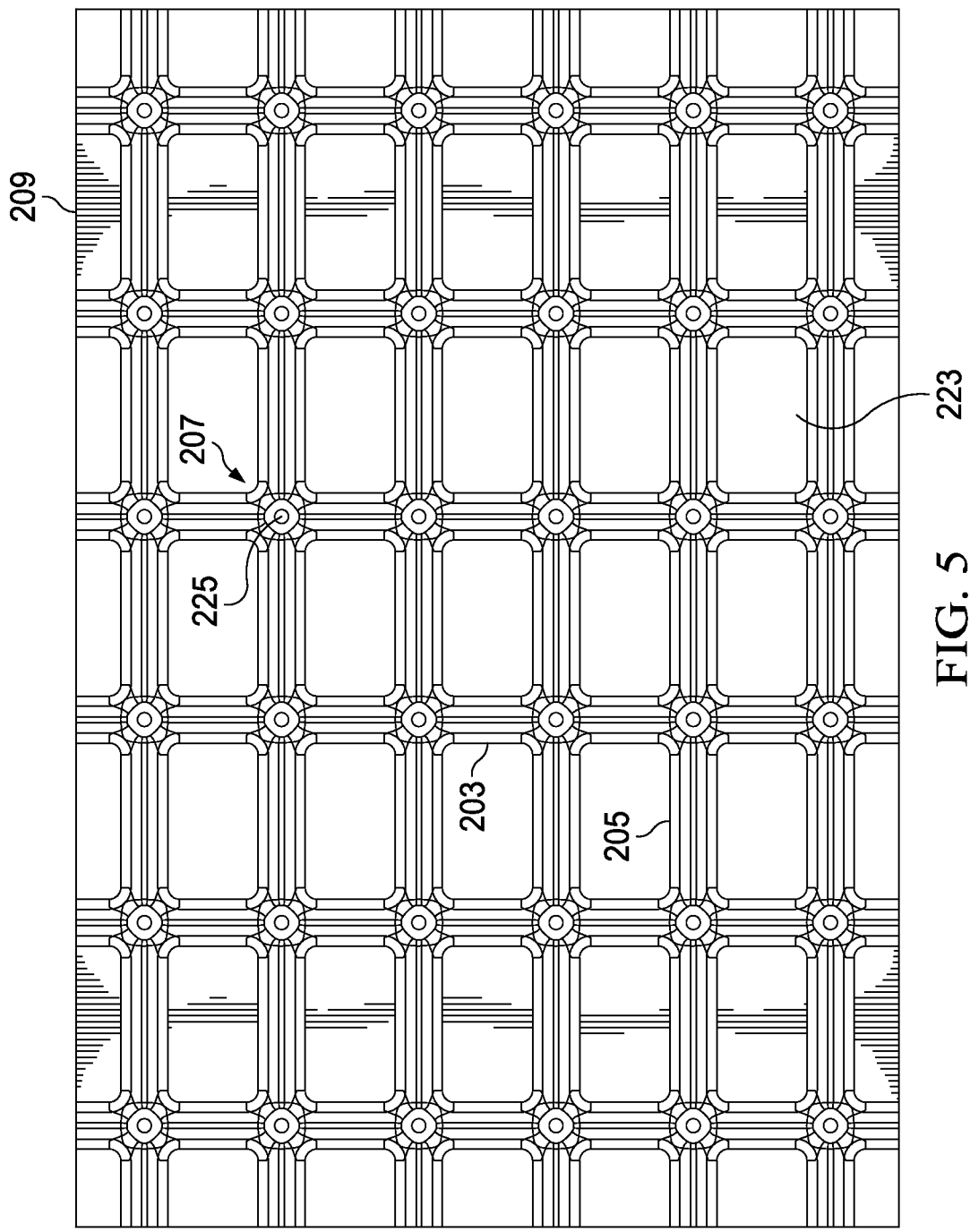
FIG. 5 is a bottom view of the integrally stiffened panel from FIG. 2, according to the preferred embodiment of the present application.
Figure 7:
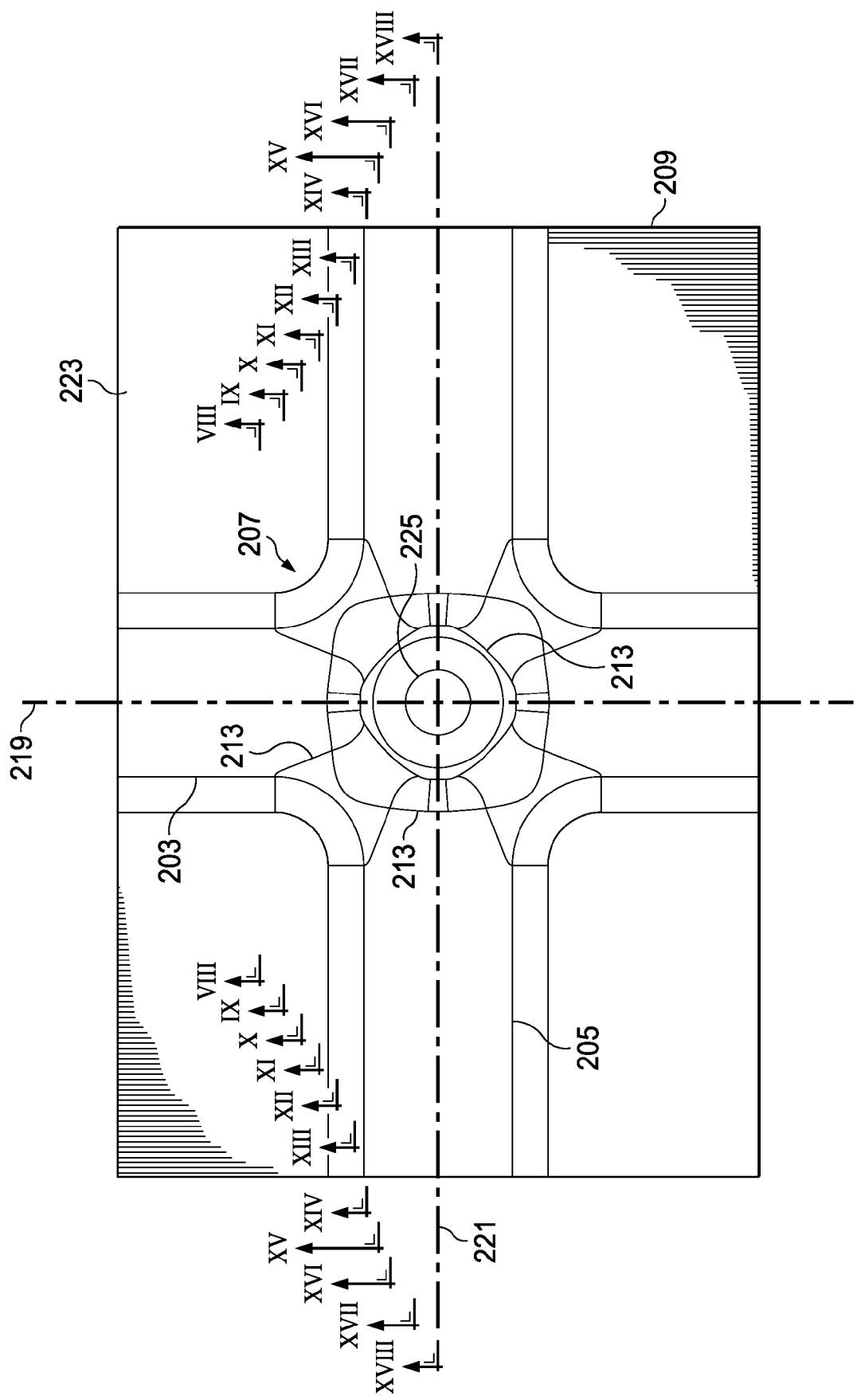
FIG. 7 is a top detail view of a joint from the panel of FIG. 2, according to the preferred embodiment of the present application.
Figure 41:
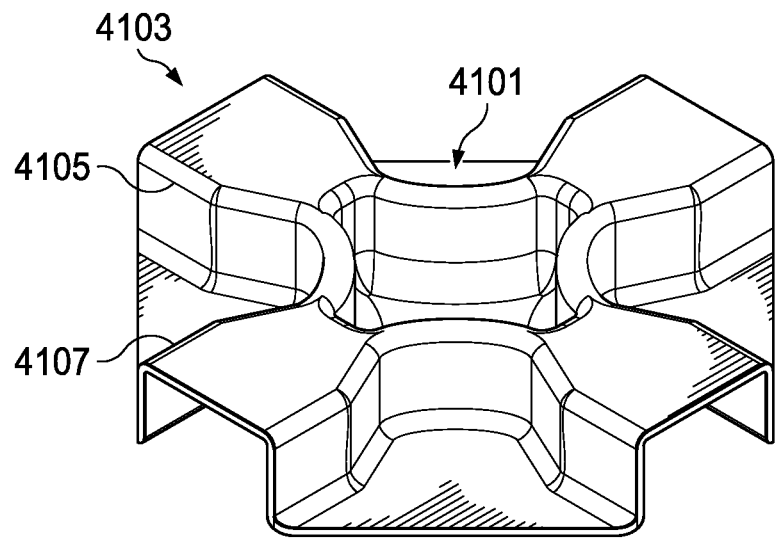
FIG. 41 is an isometric view of a joint of an integrally stiffened panel, according to an illustrative embodiment of the present application.
Figure 42:
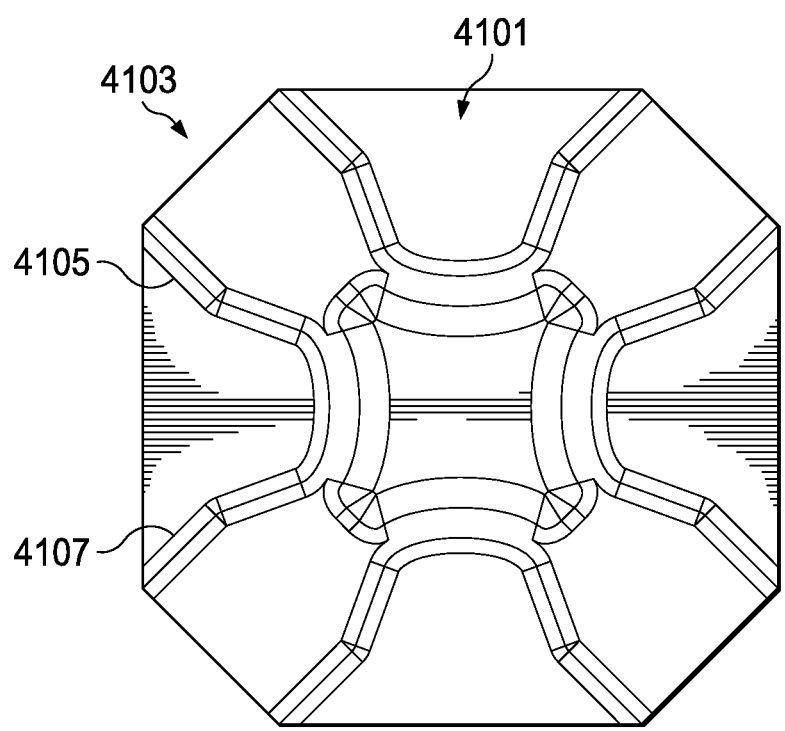
FIG. 42 is a top view of the joint of the integrally stiffened panel from FIG. 41, according to an illustrative embodiment of the present application.

Referring now to FIGS. 41 and 42, a joint 4101 is an illustrative embodiment that is substantially similar to joint 207 (as shown in FIG. 6). However, where the inverted pocket geometry of joint 207 is substantially circular, the inverted pocket geometry of joint 4101 has an approximately cruciform shape. Further, joint 4101 is part of a panel 4103 that is substantially similar to panel 201. For example, panel 4103 has stiffeners 4105 and 4107 that are substantially similar to stiffeners 203 and 205, respectively. Joint 4101 is exemplary of a wide variety of geometries that joint 207 can exemplify in an implementation of the invention. It should be appreciated that even though panel 4103 is illustrated with stiffeners 4105 and 4107 necking down prior to intersecting at joint 4101, other embodiments panel 4103 can include stiffeners 4105 and 4107 having relatively constant cross sectional geometries leading up to the intersection at joint 4101.

The integrally stiffened panel of the present application provides significant advantages, including: 1) providing a panel having stiffness continuity through intersecting bead stiffeners across an inverted pocket joint; 2) providing a panel having high efficiency load carrying capacity; 3) providing a panel having multiple load paths; and 4) providing an efficient panel capable of use in a wide variety of applications.

The particular embodiments disclosed above are illustrative only, as the apparatuses may be modified and practiced in different but equivalent manners apparent to those skilled in the art having the benefit of the teachings herein. Modifications, additions, or omissions may be made to the apparatuses described herein without departing from the scope of the invention. The components of the apparatuses may be integrated or separated. Moreover, the operations of the apparatuses may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

The invention claimed is:

1. An integrally stiffened panel comprising:
    a sheet member having a land surface;
    a first stiffener integral to the sheet member, the first stiffener having a first side sloping upward from the land surface to a first height, and a second side sloping downward from the first height to the land surface;
    a second stiffener integral to the sheet member, the second stiffener having a third side sloping upward from the land surface to a second height, and a fourth side sloping downward from the second height to the land surface; and
    a joint at an intersection of the first stiffener and the second stiffener, the joint having an inverted pocket that slopes downward from the first height of the first stiffener at a first initial inversion and that slopes downward from the second height of the second stiffener at a second initial inversion;
    wherein a plane that is normal to a first axis of the first stiffener and parallel to a second axis of the second stiffener, traverses through the first initial inversion of the joint and also extends through the first side of the first stiffener.

2. The integrally stiffened panel according to claim 1, wherein the inverted pocket includes a circular shaped interior portion.

3. The integrally stiffened panel according to claim 1, wherein the inverted pocket includes a cruciform shaped interior portion.

4. The integrally stiffened panel according to claim 1, wherein the first axis and the second axis are perpendicular to each other.

5. The integrally stiffened panel according to claim 1, wherein the land area located between the first stiffener and the second stiffener includes a hole.

6. The integrally stiffened panel according to claim 5, wherein the inverted pocket has a pocket surface that is approximately parallel to a surface of the land area.

7. The integrally stiffened panel according to claim 5, wherein a thickness of the land area is reduced by a machining operation.

8. The integrally stiffened panel according to claim 5, wherein the land area is partially removed by a machining operation.

9. The integrally stiffened panel according to claim 1, wherein the first stiffener and the second stiffener are convex, but the inverted pocket of the joint is concave.

10. The integrally stiffened panel according to claim 1, further comprising:
    a radius at the transition between the first side of the first stiffener, the third side of the second stiffener, and the inverted pocket.

11. The integrally stiffened panel according to claim 1, wherein the first stiffener and the second stiffener each have a hat shaped cross-sectional geometry.

12. The integrally stiffened panel according to claim 1, further comprising:
    a frame member at least partially located around a perimeter of the integrally stiffened panel.

13. The integrally stiffened panel according to claim 1, further comprising:
    a skin coupled to the sheet member.

14. The integrally stiffened panel according to claim 1, wherein the first stiffener and the second stiffener are convex, but the inverted pocket of the joint is concave.

15. An aircraft comprising:
   a fuselage;
   a landing gear;
   an integrally stiffened panel, comprising:
      a sheet member having a land surface;
      a first stiffener integral to the sheet member, the first stiffener having a first side sloping upward from the land surface to a first height, and a second side sloping downward from the first height to the land surface;
      a second stiffener integral to the sheet member, the second stiffener having a third side sloping upward from the land surface to a second height, and a fourth side sloping downward from the second height to the land surface; and
      a joint at an intersection of the first stiffener and the second stiffener, the joint having an inverted pocket that slopes downward from the first height of the first stiffener at a first initial inversion and that slopes downward from the second height of the second stiffener at a second initial inversion;
      wherein a plane that is normal to a first axis of the first stiffener and parallel to a second axis of the second stiffener, traverses through the first initial inversion of the joint and also extends through the first side of the first stiffener.

16. The aircraft according to claim 15, further comprising:
   a rotor system; and
   an empennage.

17. The aircraft according to claim 15, wherein the integrally stiffened panel is part of a door member.

18. The aircraft according to claim 15, wherein the integrally stiffened panel is an internal structure in the aircraft.

19. The aircraft according to claim 15, further comprising:
   a contoured skin coupled to the sheet member.

* * * * *